(12) United States Patent
Ford et al.

(10) Patent No.: US 10,592,985 B2
(45) Date of Patent: Mar. 17, 2020

(54) SYSTEMS AND METHODS FOR A COMMODITY CONTRACTS MARKET USING A SECURE DISTRIBUTED TRANSACTION LEDGER

(71) Applicant: DELL PRODUCTS L.P., Round Rock, TX (US)

(72) Inventors: Daniel A. Ford, Mount Kisco, NY (US); Rajesh Narayanan, San Jose, CA (US)

(73) Assignee: DELL PRODUCTS L.P., Round Rock, TX (US)

( * ) Notice: Subject to any disclaimer, the term of this patent is extended or adjusted under 35 U.S.C. 154(b) by 1206 days.

(21) Appl. No.: 14/802,847

(22) Filed: Jul. 17, 2015

(65) Prior Publication Data

US 2016/0260171 A1    Sep. 8, 2016

Related U.S. Application Data

(63) Continuation-in-part of application No. 14/750,822, filed on Jun. 25, 2015, now Pat. No. 9,967,334, which
(Continued)

(51) Int. Cl.
*G06Q 40/04*    (2012.01)
*G06Q 20/22*    (2012.01)
(Continued)

(52) U.S. Cl.
CPC ............ *G06Q 40/04* (2013.01); *G06Q 20/10* (2013.01); *G06Q 20/223* (2013.01);
(Continued)

(58) Field of Classification Search
CPC ...... G06Q 40/04; G06Q 20/10; G06Q 20/223; G06Q 20/389; G06Q 20/42; G06Q 2220/00; G06Q 2220/10
(Continued)

(56) References Cited

U.S. PATENT DOCUMENTS 6,591,292 B1    7/2003    Morrison
7,130,999 B2    10/2006    Yasala
(Continued)

OTHER PUBLICATIONS

Mougayar ("The Blockchain is the New Database, Get Ready to Rewrite Everything", Brave new coin, Jan. 2, 2015, 7 pages, retrieved from https://bravenewcoin.com/insights/the-blockchain-is-the-new-database-get-ready-to-rewrite-everything (Year: 2015).*
(Continued)

*Primary Examiner* — James D Nigh
(74) *Attorney, Agent, or Firm* — North Weber & Baugh LLP

(57) ABSTRACT

Aspects of the present invention provide systems and methods that solved the problems of how to participate in a marketplace exchange without using a centralized intermediary. In embodiments, a secure distributed transaction ledger may be used as an integration framework that supports communications between parties, the transfer of funds from one party to another party, and the ability to for the provisioning or transfer of deliverables by a seller to a buyer or for the benefit of a buyer. In embodiments, a buyer, a seller, and an escrow entity have defined functions that facilitate transactions and help build in more trust into the marketplace.

20 Claims, 20 Drawing Sheets

Related U.S. Application Data is a continuation-in-part of application No. 14/732,504, filed on Jun. 5, 2015, now Pat. No. 9,967,333, which is a continuation-in-part of application No. 14/702,321, filed on May 1, 2015, now Pat. No. 9,965,628, which is a continuation-in-part of application No. 14/635,577, filed on Mar. 2, 2015, said application No. 14/750,822 is a continuation-in-part of application No. 14/725,347, filed on May 29, 2015, which is a continuation-in-part of application No. 14/635,577, filed on Mar. 2, 2015.

(51) Int. Cl.
    *G06Q 20/42*      (2012.01)
    *G06Q 20/10*      (2012.01)
    *G06Q 20/38*      (2012.01)

(52) U.S. Cl.
    CPC ........... *G06Q 20/389* (2013.01); *G06Q 20/42* (2013.01); *G06Q 2220/00* (2013.01); *G06Q 2220/10* (2013.01)

(58) Field of Classification Search
    USPC ........................................................ 705/75
    See application file for complete search history.

(56) References Cited

U.S. PATENT DOCUMENTS

| | | |
|---|---|---|
| 7,379,913 B2 | 5/2008 | Steele |
| 9,135,787 B1 | 9/2015 | Russell |
| 9,256,467 B1 | 2/2016 | Singh |
| 9,298,806 B1 | 3/2016 | Vessenes |
| 9,397,985 B1 | 7/2016 | Seger, II |
| 9,406,063 B2 | 8/2016 | Zhou |
| 9,514,293 B1 | 12/2016 | Moritz |
| 9,965,759 B2 | 5/2018 | Watson, III |
| 10,043,174 B1 | 8/2018 | Chikkanna |
| 2001/0049726 A1 | 12/2001 | Comeau |
| 2008/0133531 A1 | 6/2008 | Baskerville |
| 2008/0320565 A1 | 12/2008 | Buch |
| 2009/0132419 A1 | 5/2009 | Grammer |
| 2009/0150972 A1 | 6/2009 | Moon |
| 2011/0211692 A1 | 9/2011 | Raykova |
| 2012/0163584 A1 | 6/2012 | Adiedi |
| 2013/0097417 A1 | 4/2013 | Lauter |
| 2013/0254532 A1 | 9/2013 | Raykova |
| 2013/0329883 A1 | 12/2013 | Tamayo-Rios |
| 2014/0201057 A1 | 7/2014 | Shuster |
| 2014/0279433 A1 | 9/2014 | Holman |
| 2014/0344015 A1 | 11/2014 | Puértolas-Montañés et al. |
| 2014/0372769 A1 | 12/2014 | Kerschbaum |
| 2015/0006739 A1 | 1/2015 | Misra et al. |
| 2015/0142878 A1 | 5/2015 | Hebert |
| 2015/0287026 A1 | 10/2015 | Yang |
| 2015/0295712 A1 | 10/2015 | Veugen |
| 2015/0310424 A1 | 10/2015 | Myers |
| 2015/0348017 A1 | 12/2015 | Allmen |
| 2015/0356524 A1 | 12/2015 | Pennanen |
| 2015/0356555 A1 | 12/2015 | Pennanen |
| 2015/0363783 A1 | 12/2015 | Ronca |
| 2015/0371224 A1 | 12/2015 | Lingappa |
| 2015/0379510 A1 | 12/2015 | Smith |
| 2016/0071108 A1 | 3/2016 | Caldera |
| 2016/0086175 A1 | 3/2016 | Finlow-Bates |
| 2016/0119119 A1 | 4/2016 | Calapodescu |
| 2016/0140653 A1 | 5/2016 | McKenzie |
| 2016/0164884 A1 | 6/2016 | Sriram |
| 2016/0217436 A1 | 6/2016 | Brama |
| 2016/0218879 A1 | 7/2016 | Ferrin |
| 2016/0253622 A1 | 9/2016 | Sriram |
| 2016/0254910 A1 | 9/2016 | Finlow-Bates |
| 2016/0260069 A1 | 9/2016 | Holman |
| 2016/0260095 A1 | 9/2016 | Ford |
| 2016/0260169 A1 | 9/2016 | Arnold |
| 2016/0261685 A1 | 9/2016 | Chen |
| 2016/0267472 A1 | 9/2016 | Lingham |
| 2016/0275461 A1 | 9/2016 | Sprague |
| 2016/0283920 A1 | 9/2016 | Fisher |
| 2016/0292672 A1 | 10/2016 | Fay |
| 2016/0300227 A1 | 10/2016 | Subhedar |
| 2016/0300234 A1 | 10/2016 | Moss-Pultz |
| 2016/0306966 A1 | 10/2016 | Srivastava |
| 2016/0321654 A1 | 11/2016 | Lesavich |
| 2016/0330027 A1 | 11/2016 | Ebrahimi |
| 2016/0330031 A1 | 11/2016 | Drego |
| 2016/0335628 A1 | 11/2016 | Weigold |
| 2016/0342977 A1 | 11/2016 | Lam |
| 2016/0342978 A1 | 11/2016 | Davis |
| 2016/0342989 A1 | 11/2016 | Davis |
| 2016/0342994 A1 | 11/2016 | Davis |
| 2016/0344543 A1 | 11/2016 | Alness |
| 2016/0350749 A1 | 12/2016 | Wilkins |
| 2016/0358165 A1 | 12/2016 | Maxwell |
| 2016/0358184 A1 | 12/2016 | Radocchia |
| 2017/0005804 A1 | 1/2017 | Zinder |
| 2017/0061398 A1 | 3/2017 | Joseph |
| 2017/0170960 A1 | 6/2017 | Shaked |
| 2017/0236123 A1 | 8/2017 | Ali |
| 2017/0243241 A1 | 8/2017 | Boutelle |
| 2017/0279800 A1 | 9/2017 | Castinado |
| 2017/0295021 A1 | 10/2017 | Aranda Gutierrez |
| 2017/0310653 A1 | 10/2017 | Zhang |

OTHER PUBLICATIONS

EDIbasics (retrieved from https://web.archive.org/web/20150124223923/https://www.edibasics.com/edi-resources/document-standards/ansi/, archived on Jan. 24, 2015, 7 pages) (Year: 2015).*

"BitCloud," printed from the internet: URL:http://www.bitcloudproject.org, 2014, 14pgs.

Buterin, Vitalik, Ethereum White Paper, "A Next Generation Smart Contract & Decentralized Application Platform," 2014, printed from the internet: URL:http://ethereum.org/pdfs/ethereumwhitepaper.pdf, 36pgs.

Satoshi Nakamoto, "Bitcoin: A Peer-to-Peer Electronic Cash System," 9pgs.

Wood, Dr. Gavin, "Ethereum: A Secure Decentralised Generalised Transaction Ledger Final Draft—Under Review," www.ethereum.org, 2014, printed from the internet: URL:http://gavwood.com/paper.pdf, 29pgs.

Namecoin, printed from the internet: URL:http://namecoin.info/, 3pgs.

Syscoin, printed from the internet: URL:http://syscoin.org/, 2pgs.

Syscoin, printed from the internet: URL: http://syscoin.org/doc_uploads/How_Syscoin_Innovates_Infographic.png.

Szabo, Nick, "The Mental Accounting Barrier to Micropayments," printed from the internet: URL:http://szabo.best.vwh.net/micropayments.html, 1996, 4pgs.

Notice of Allowance and Fees Due dated Jan. 24, 2018, in U.S. Appl. No. 14/750,822, (17 pgs).

Final Office Action dated Jul. 7, 2017, in U.S. Appl. No. 14/732,504, (14 pgs).

Response filed Sep. 7, 2017, in related U.S. Appl. No. 14/732,504, (10 pgs).

Non-Final Office Action dated Jun. 22, 2017, in U.S. Appl. No. 14/750,347, (41 pgs).

Response filed Sep. 22, 2017, in related U.S. Appl. No. 14/732,504, (12 pgs).

Final Office Action dated Jul. 26, 2017, in U.S. Appl. No. 14/750,822, (24 pgs).

Response filed Jun. 12, 2018, in U.S. Appl. No. 14/725,347, (12 pgs).

Notice of Allowance and Fees Due dated Jan. 29, 2018, in U.S. Appl. No. 14/702,321, (19 pgs).

Response filed Dec. 6, 2018, in U.S. Appl. No. 14/725,347, (12 pgs).

Non-Final Office Action dated Dec. 29, 2016, in U.S. Appl. No.14/732,504 (17 pgs).

(56) References Cited

OTHER PUBLICATIONS

Non-Final Office Action dated Jan. 17, 2017, in U.S. Appl. No. 14/750,822 (18 pgs).
Non-Final Office Action dated Jan. 20, 2017, in U.S. Appl. No. 14/725,347 (42 pgs).
Kitahara et al, "A Method of Digital Rights Management based on Bitcoin Protocol", Jan. 2014, IMCOM (ICUIMC), ACM p. 1-6, (6 pgs).
Underwood, "Blockchain Beyond Bitcoin", Nov. 2016, Communications of ACM, vol. 59, No. 11, p. 15-17, (3 pgs).
Maxwell et al, "'Effing' the Ineffable: Opening up Understandings of the Blockchain", Jul. 2015, British HCI, ACM, p. 208-209, (pp. 2).
Crary et al, "Peer-to-Peer Affine Commitment using Bitcoin", Jun. 2015, PLDI' 15, ACM, p. 479-488, (10 pgs).
Dziembowski, "Introduction to Cryptocurrencies", Oct. 2015, CCS' 15, ACM, p. 1700-1701, (2 pgs).
Coeckelbergh et al, "Cryptocurrencies as Narrative Technologies", Sep. 2015, SIGCAS Computers & Society, vol. 45, No. 3, p. 172-178, (7pgs).
Anteniese et al, "Certified Bitcoins", Sapienza-University of Rome, Italy, ACNS 2014, pp. 80-96, (17 pgs).
Barber et al, "Bitter to Better—How to make Bitcoin a Better Currency," 2012, pp. 399-414, (16pgs).
Non-Final Office Action dated Dec. 16, 2016, in U.S. Appl. No. 14/702,321 (16 pgs).
Response filed Mar. 16, 2017, in related U.S. Appl. No. 14/702,321 (13 pgs).
Response filed Mar. 29, 2017, in related U.S. Appl. No. 14/732,504 (12 pgs).
Final Office Action dated Jan. 12, 2018, in U.S. Appl. No. 14/725,347, (43 pgs).
Notice of Allowance and Fees Due dated Jan. 17, 2018, in U.S. Appl. No. 14/732,504, (12 pgs).
Rizzo, Pete, "Fred Wilson: Blockchain Applications Still Biggest Opportunity in Bitcoin," Jan. 24, 2015, printed from the internet: URL:http://www.coindesk.com/fred-wilson-blockchain-applications-still-biggest-opportunity-bitcoin/, 7pgs.
Kraudel, Ryan, Business Wire Apr. 14, 2014, "6fusion, CME Group Sign Definitive Agreement to Develop IaaS Commodity Exchange," printed from the internet: URL:http://www.marketwatch.com/story/6fusion-cme-group-sign-definitive-agreement-to-develop-iaas-commodity-exchange-2014-04-14, 3pgs.
6fusion, "The Economic Measure of IT Infrastructure," printed from the internet: URL:http://www.6fusion.com/technology/workload-allocation-cube/, 3pgs.
Wikipedia, "Chicago Mercantile Exchange," printed from the internet:URL:http://en.wikipedia.org/wiki/Chicago_Mercantile_Exchange, 4pgs.
Final Office Action dated Oct. 6, 2017, in U.S. Appl. No. 14/702,321 (23 pgs).
Non-Final Office Action dated Nov. 9, 2017, in related U.S. Appl. No. 14/732,504 (8 pgs).
Peck, "Do You Need a Blockchain? This Chart will tell you if the technology can solve your problem", Oct. 2017, IEEE, p. 1-3 (3 pgs).
Crosby et al, "BlockChain Technology, Beyond Bitcoin", Oct. 16, 2015, Sutardja Center fro Entrepreneurship & Technology Technical Report, p. 1-35 (35 pgs).
Boudguiga et al, "Towards Better Availability and Accountability for IoT Updates by means of a Blockchain", 2017, 2017, IEEE European Symposium on Security and Privacy Workshops (EuroS&PW), p. 50-58 (9 pgs).
Response filed Dec. 19, 2017 in related U.S. Appl. No. 14/732,504 (8 pgs).
Response filed Dec. 21, 2017 in related U.S. Appl. No. 14/702,321 (13 pgs).
Notice of Allowance and Fee Due dated Nov. 24, 2017 in related U.S. Appl. No. 14/750,5822 (8 pgs).
Non-Final Office Action dated Sep. 6, 2018, in U.S. Appl. No. 14/725,347, (29 pgs).
Franca "Homomorphic Mini-blockchain Scheme," Apr. 24, 2015, pp. 1-22 (22 pgs).
Notice of Allowance and Fees Due dated May 6, 2019, in U.S. Appl. No. 14/725,347. (21 pgs).
Notice of Allowance and Fees Due dated Jul. 15, 2019, in U.S. Appl. No. 14/725,347. (11 pgs).
Decker et al., "Information Propagation in the Bitcoin Network," IEEE, 2013. (10 pgs).

* cited by examiner

Seller -- Proposal Broadcast

500

Seller -- Proposal Counteroffer

Seller -- Proposal Accepted

700

Seller -- Funds in Escrow

800

Seller -- Escrow Funds Payout

Seller -- Buyer Rejection

Seller -- No Message Procedure

Buyer -- Proposal Broadcast

Buyer -- Proposal Counteroffer

Buyer -- Proposal Accepted

Buyer -- Virtual Good/Service

Buyer -- No Message Procedure

Escrow

Escrow -- Transfer Funds

Escrow -- Release Funds

Escrow -- Buyer Rejection

Escrow -- Funds Payout Request

Escrow -- No Message Procedure

SYSTEMS AND METHODS FOR A COMMODITY CONTRACTS MARKET USING A SECURE DISTRIBUTED TRANSACTION LEDGER

CROSS-REFERENCE TO RELATED APPLICATION

This patent application claims priority to and is a continuation-in-part of co-pending and commonly-owned U.S. patent application Ser. No. 14/750,822 filed on 25 Jun. 2015, entitled "COMPUTING DEVICE CONFIGURATION AND MANAGEMENT USING A SECURE DECENTRALIZED TRANSACTION LEDGER," listing Daniel A. Ford as inventor, and which issued as U.S. Pat. No. 9,967,334, on 8 May 2018, which claims priority to and is a continuation-in-part of co-pending and commonly-owned:

(A) U.S. patent application Ser. No. 14/732,504, filed on 5 Jun. 2015, entitled "DEFERRED CONFIGURATION OR INSTRUCTION EXECUTION USING A SECURE DISTRIBUTED TRANSACTION LEDGER," listing YuLing Chen and Daniel A. Ford as inventors, and which issued as U.S. Pat. No. 9,967,333, on 8 May 2018, which claims priority to and is a continuation-in-part of co-pending and commonly-owned U.S. patent application Ser. No. 14/702,321, filed on 1 May 2015, entitled "DEVICE REPORTING AND PROTECTION SYSTEMS AND METHODS USING A SECURE DISTRIBUTED TRANSACTIONAL LEDGER," listing Daniel A. Ford and YuLing Chen as inventors, and which issued as U.S. Pat. No. 9,965,628, on 8 May 2018, which claims priority to and is a continuation-in-part of co-pending and commonly-owned U.S. patent application Ser. No. 14/635,577, filed on 2 Mar. 2015, entitled "CONTAINERIZED COMPUTATIONAL TASK EXECUTION MANAGEMENT USING A SECURE DISTRIBUTED TRANSACTION LEDGER," listing Daniel A. Ford as inventor; and (B) U.S. patent application Ser. No. 14/725,347, filed on 29 May 2015, entitled "METHODS AND SYSTEMS FOR OBFUSCATING DATA AND COMPUTATIONS DEFINED IN A SECURE DISTRIBUTED TRANSACTION LEDGER," listing Daniel A. Ford, Irwin O. Reyes, and Rajesh Narayahan as inventors, and which issued as U.S. Pat. No. 10,484,168, on 19 Nov. 2019, which claims priority to and is a continuation-in-part of co-pending and commonly-owned U.S. patent application Ser. No. 14/635,577, filed on 2 Mar. 2015, entitled "CONTAINERIZED COMPUTATIONAL TASK EXECUTION MANAGEMENT USING A SECURE DISTRIBUTED TRANSACTION LEDGER," listing Daniel A. Ford as inventor.

Each of the above-mentioned patent documents is incorporated by reference herein in its entirety and for all purposes.

A. TECHNICAL FIELD

The present disclosure relates to systems and methods for facilitating a marketplace and marketplace transactions using secure distributed transaction ledger that does not require a centralized authority.

B. DESCRIPTION OF THE RELATED ART

As the value and use of information continues to increase, individuals and businesses seek additional ways to process and store information. One option available to users is information handling systems. An information handling system (or computing device) generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use, such as financial transaction processing, airline reservations, enterprise data storage, or global communications. In addition, information handling systems may include a variety of hardware and software components that may be configured to process, store, and communicate information and may include one or more computer systems, data storage systems, and networking systems.

The last several years have also seen a dramatic increase in the use of computing devices and also in computing capacity. As a result, information handling systems exists in many different applications and form factors—including servers, laptops, mobile phones, tablets, smart watches, phablets, appliances, thermostats, smart packages, etc. These devices represent powerful computing resources—but many of these devices are underutilized. Accordingly, these devices could provide powerful computing resources, virtual goods, or services that could be used by others.

One of the key problems with a marketplace, particularly a marketplace of virtual goods and services, is the untrusted nature of the participants. Furthermore, a remaining problem to be solved is the mechanism for enabling a very large number of heterogeneous processors to participate in such marketplaces in ways that are secure and scale well.

One approach is to have a centralized marketplace controller. Such approaches would have some signification drawbacks. First, these centralized controller have limited resources and can suffer from resource constraints. Second, market participants would be relying upon the security and trustworthiness of the centralized controller to maintain integrity of the system. If the centralized service does not have good security systems and practices, or is itself untrustworthy, the marketplace is vulnerable and untrustworthy. Third, because it is a centralized service, it is susceptible to spoofing and other such attacks. Fourth, if the centralized controller is blocked or no longer offers the service, then the market participants may be left unable to access the marketplace or unable to resolve unfulfilled contracts. Finally, the centralized service has a powerful role and can compromise the operation of the marketplace or take actions that are unwanted by market participants.

Accordingly, what is needed are systems and methods that facilitate a market and market transactions between computing devices without requiring a centralized authority.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

Figure 1:
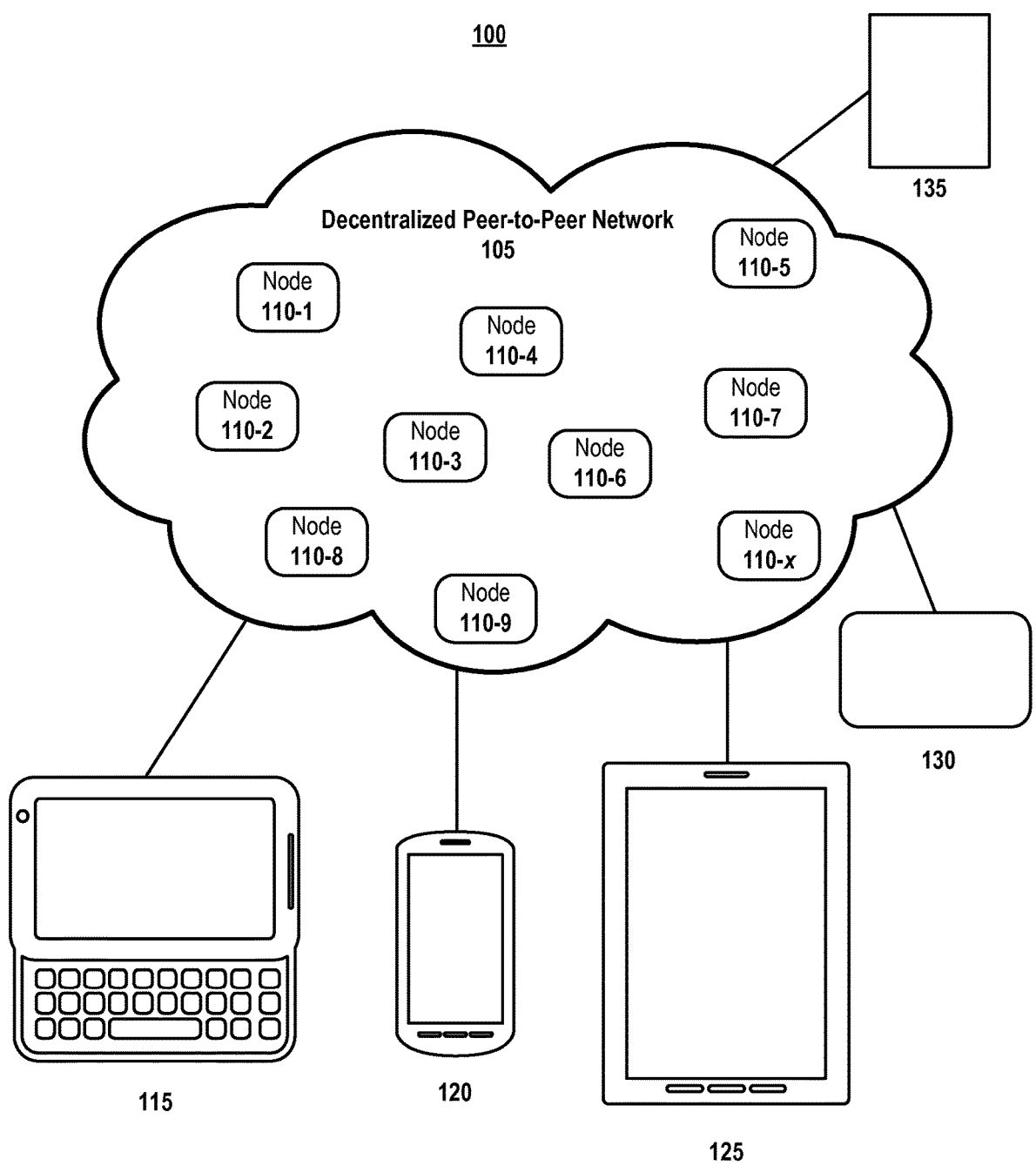
FIG. 1 ("FIG. 1") depicts a decentralized network for providing communications to and from devices according to embodiments of the present invention.

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method on a tangible computer-readable medium.

Components, or modules, shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated.

The terms "messages," "blocks," and "data," shall be understood to mean a group of bits that can be transported across a network. These terms shall not be interpreted as limiting embodiments of the present invention to particular configuration; and, these terms along with similar terms such as "data," "data traffic," "information," "cell," etc. may be replaced by other terminologies referring to a group of bits, and may be used interchangeably. The terms "include," "including," "comprise," and "comprising" shall be understood to be open terms and any lists the follow are examples and not meant to be limited to the listed items. Any headings used herein are for organizational purposes only and shall not be used to limit the scope of the description or the claims.

Furthermore, it shall be noted that: (1) certain steps may optionally be performed; (2) steps may not be limited to the specific order set forth herein; (3) certain steps may be performed in different orders; and (4) certain steps may be done concurrently.

A. General Overview

Aspects of the present invention provide systems and methods that facilitate a marketplace without using a centralized intermediary.

A commodity marketplace exchange is a venue in which commodities are traded. A commodity is often a physical good, such as wheat or gold, but increasingly, such marketplaces are evolving to include virtual commodities (i.e., non-physical) such as "units of computation" or "Workload Allocation Cubes" (WAC). Similarly, commodity marketplaces have evolved from physical locations (i.e., a "trading pit"), to computerized virtual venues with no physical existence apart from a set of computer servers.

Commodity marketplaces, physical (i.e., "open outcry") and virtual (e.g., "CME Globex"), are owned, controlled and maintained, by a centralized organizations. For instance, the Chicago Mercantile Exchange (CME), the Chicago Board of Trade (CBOT), and the New York Mercantile Exchange (NYMEX), are all owned and operated by a single entity, the CME Group. That entity controls access to the various exchanges and governs their operation. This marketplace "architecture" of having a centralized authority made sense historically, but as both commodities, and actual trading, expanded to include virtual "goods" and virtual venues, that approach, as the only logical solution, soon comes into question.

An aspect of the trading process that benefits from a centralized authority is trade reconciliation (i.e., moving money from buyer to seller), for which the authority takes a portion or charges a fee. However, once the money itself becomes virtual, and independent of central authority (i.e., a central bank and the conventional banking system), the necessity of a central authority running a commodity exchange may no longer be a requirement.

The introduction of cryptocurrencies, such as Bitcoin and Ethereum, has effectively created a virtual monetary system. This system is independent of any central authority, governmental or private, and, essentially, has no restrictions on how it may be used. In particular, no banks or other financial institutions are required (or even desired) to facilitate the transfer units of a cryptocurrency, and no permission is required to use such a currency.

With these three components, virtual goods (e.g., computational capacity), virtual trading venues, and virtual money, the need for centralized management of the commodity trading process is removed. The "delivery" of virtual goods may be verified programmatically, the actual "trading" (matching buyers and sellers) may be done programmatically, and, now, the exchange of funds may also be done programmatically.

In embodiments, a solution to the problem of how to create and participate in a commodity marketplace exchange without using a centralized intermediary is to utilize a secure distributed transactional ledger as an integration framework that supports communications between parties, the transfer of funds from one party to another party, and the specifications necessary for the provisioning or transfer of virtual goods by the seller to the benefit of the buyer.

A secure distributed transactional ledger is the underlying data structure that supports the operations of a cryptocurrency. One technique for implementing such a ledger is the use of a "block chain". In this approach, the contents of the ledger are stored in a linked list of data "blocks," where each block records a number of "transactions" (i.e., transfers of currency units between accounts). The chain is extended, and more transactions recorded in the ledger, by the addition of blocks through a process known as "mining." The mining process is cryptographically secure (hence "cryptocurrency"), and extremely difficult to corrupt.

The cryptocurrency Bitcoin uses a block chain to maintain its ledger. This is the standard technique, but various innovations are being developed in the technology, including expanding what can be recorded in a ledger to include "transactions" that embody data and/or executable programs. In the latter case, the code for the programs may be represented as collections of "bytecode" instructions for a virtual machine. Thus, a ledger is a data structure that can record both data and code (which can be executable code), and does so in a way that a computing device can validate the authenticity of the data and/or code, and with which the computing device can record its own data and/or code for others to validate and consume.

One of the key characteristics of the ledger is that it serves as a trustworthy data source in an environment in which, in general, no individual data source can be trusted; in particular, in an environment where there is no central controlling authority that either exists, or, if it did, it may not be trusted. The ledger is trusted by being a cryptographically verifiable aggregation of a large number of data sources, most of whom are trustworthy. The ledger is secure because it contains a cryptographically verifiable consensus of its contents that is produced and maintained by the large number of ledger participants in a manner that is computationally difficult to forge. Being maintained by many users, or nodes, makes the ledger completely decentralized. There is no single source for the ledger, and a user can verify that the ledger's contents are correct.

In embodiments, the ledger may utilize data of various types and sizes. For any particular computing device, it may contain virtual goods, configuration information, commands, queries, software updates, cause performance of services, or any other data relevant to the computing device.

In embodiments, aspects of the present invention comprise having a computing device (or devices) retrieve and maintain a copy of the ledger. It watches the contents of the ledger for messages that it should or may want to process. In embodiments, a device may initiate requests or generate replies by adding its own messages, or other data, into the ledger.

In embodiments, a secure distributed transactional ledger, which is a publicly readable data structure that is maintained by a large number of distributed, separately owned and administered computers, may be used to communicate messages and/or deliver virtual goods or services to devices. Thus, so long as the ledger is maintained, the contents of a ledger are always accessible; and, due to the manner in which the ledger is maintained, it can always be trusted. Thus, any messages entered into a ledger may be retrieved in the future without hindrance. For example, a message may be retrieved by a computing system. In embodiments, the messages may be obfuscated (e.g., encrypted) such that their true nature cannot be determined except by the end recipient. Access to the ledger means that the messages will be receivable by the computing device.

It shall also be noted that there are several advantages to such systems. For example, the advantages of using a secure distributed transactional ledger include that it is a widely accessible, redundantly distributed, data structure that provides logical and temporal decoupling between both ends of a communications dialog. This is useful because, by its nature, it is highly available, is extremely secure, and allows indirect communication. It shall be noted that the last point is useful because it dramatically simplifies how communication channels are established and maintained when more specific network addressing information might not be available.

Additional details are provided by way of illustration through description of various embodiments, below. These embodiments are provided by way of illustration and not limitation; one skilled in the art shall recognize other applications and embodiments that fall within the scope of the invention.

B. Decentralized Network Implementations

FIG. 1 depicts an embodiment of a distributed peer-to-peer network 105, which comprises a plurality of nodes 110-1 through 110-$n$ (which may be referred to herein individually or collectively (depending upon context) as 110-$x$) and may be implemented by a plurality of information handling systems. In embodiments, an information handling system includes any instrumentality or aggregate of instrumentalities operable to compute, classify, process, transmit, receive, retrieve, originate, switch, route, store, display, manifest, detect, record, reproduce, handle, or utilize any form of information, intelligence, or data for business, scientific, control, entertainment, or other purposes. For example, an information handling system can be a personal computer, a laptop computer, a smart phone, a tablet device, a smart package, or other electronic device, a network server, a network storage device, a switch router or other network communication device, or any other suitable device and may vary in size, shape, performance, functionality, and price. Further, an information handling system may include processing resources for executing machine-executable code, such as a central processing unit (CPU), a programmable logic array (PLA), an embedded device such as a System-on-a-Chip, or other control logic hardware. An information handling system may also include one or more computer-readable media for storing machine-executable code, such as software or data. Additional components of an information handling system may include one or more storage devices that can store machine-executable code, one or more communications ports for communicating with external devices, and various input and output (I/O) devices, such as a keyboard, a mouse, and a video display.

Peer-to-peer network 105 represents a computing environment for operating a decentralized framework that maintains a distributed data structure, which may be referred to herein as a secure distributed transaction ledger or a block chain. This secure distributed transaction ledger may support various functions, such as distributing computational tasks from one or more systems to one or more other systems, supporting a cryptocurrency and messaging, among other functions.

To maintain the secure distributed transaction ledger among the various nodes 110-$x$ in the peer-to-peer network 105, a set of procedures are followed. Generally, such a network would suffer from inherent uncertainty and distrust between the nodes when they transact because they are typically unaffiliated with each other, may be transacting across vast distances (including in different countries), may be transacting anonymously, and because there is no centralized control or management to monitor or to resolve disputes. However, because the ledger is maintained publicly (i.e., all nodes can get a copy of the ledger) and because it is maintained according to set procedures that employ cryptographic methods and a proof-of-work concept, the uncertain and distrust elements are mitigated.

Thus, in embodiments, the secure distributed transaction ledger, or block chain, is a public ledger maintained collectively by the nodes in the network 105. The block chain includes blocks with data regarding recent transactions and/or messages, linking data that links one block to its previous block in the block chain, proof-of-work data that ensures that the state of the block chain is valid, and is endorsed by the majority of the record keeping systems. Furthermore, in embodiments, all confirmed transactions are included in the block chain and are done so using cryptography. This way, the integrity and the chronological order of the block chain are enforced and can be independently verified by each node.

In embodiments, the new transactions are added to the block chain using a distributed consensus system that confirms these pending transactions by including them in the block chain through a process commonly referred to as "mining." Mining enforces a chronological order in the block chain and helps create and maintain integrity of the system. For transactions to be confirmed during the mining process, the transactions must be packed in a block and linked to the prior block, according to a set procedures involving cryptography (e.g., cryptographic checksums).

Properly adding a block to the chain is very computationally intensive, but it is also relatively easy to verify. Because of this computational asymmetry, the block chain can be readily verified but nearly impossible to modify while maintaining the correct chaining. Thus, this linking prevents previous blocks from being modified because doing so would invalidate all following blocks.

In embodiments, as a reward for mining, nodes earn fees for the transactions that they successfully add to the block chain. However, the mining is so difficult that it essentially creates a competitive lottery between the nodes in which the node that is able to successfully add the block to the chain, before any other node, gets rewarded. In embodiments, the reward can be units of a cryptocurrency.

A cryptocurrency is a virtual currency that utilizes a block chain to maintain and operate payment transactions securely and transparently. Examples of different instances of cryptocurrencies include Bitcoin, Linkcoin, Ripple, Nxt, Ether, or other cryptocurrencies.

In embodiments, data is received by one or more nodes in the peer-to-peer network for inclusion in the block chain. This data is generally referred to as a "transaction" and is made available generally to the nodes in the peer-to-peer network. A node that is functioning as a mining node will collect a set of such transactions and group them into a prototype block for potential inclusion as the next block in the block chain. That linkage is recorded by storing the unique identifier (i.e., the cryptographic checksum) of the most recent block in the chain inside of the (new) prototype block such that any reference to the prototype block (via its yet-to-be-determined cryptographic checksum identifier) can be used to find the block previous to it in the chain (i.e., the current block). This arrangement creates a linked "chain" of blocks that can be easily traversed.

The prototype block will only be included in the generally available block chain maintained by the peer-to-peer network if its cryptographic checksum identifier (e.g., a 256-bit integer) meets particular constraints; typically, it must be less than a certain, network-determined, value. To accomplish this, the mining node must set the value of an integer called the "nonce," which will be included in the checksum calculations of the prototype block, to any value that produces an appropriate checksum value. All of the blocks in the block chain contain such a value to produce an appropriate cryptographic checksum value for their particular block; typically, each value will be different.

The process of determining the value of the nonce is non-trivial, and basically amounts to a search through all possible nonce values. Finding such a value is conventionally called "proof-of-work," reflecting the large amounts of computational effort (i.e., "work") required to find a valid nonce value. In reality, finding a valid nonce value is really much more like "winning" a computational "lottery."

Once a mining node finds a valid nonce value for its prototype block, it then broadcasts the block to the other nodes in the peer-to-peer network. The block will be validated by the other nodes in the network, by, among other means, computing its cryptographic checksum. The network nodes express their acceptance of the new block by working on creating the next (prototype) block in the chain, a block with a different set of transactions, and (most likely) a different nonce value. The cryptographic checksum identifier of the newly accept block will be included in the prototype block to maintain the integrity of the chain.

Another agreed-upon procedure is that the nodes always consider the longest chain to be the correct one. Because it may take time for the block to propagate through the network and because two nodes may broadcast different versions of the next block at the same time, some nodes may receive one version of the block before the other version. In such cases, a node will work on the first one it received, but save the other branch in case it becomes the longer block chain. The decision which branch to follow is made when the next proof-of-work is found and one branch becomes longer; the nodes that were working on the other branch will then switch to the longer branch. This process establishes a "consensus" version of the block chain (i.e., the one accepted by the majority), which is extremely difficult to corrupt; doing so would require mustering computational power greater than that of the current majority of mining nodes in the peer-to-peer network.

In embodiments, new transaction broadcasts do not necessarily need to reach all nodes. As long as they reach many nodes, they will get into a block. In embodiments, block broadcasts are also tolerant of dropped messages. If a node does not receive a block, it will request it when it receives the next block and realizes it missed one.

The initial concept of secure distributed transaction ledger, including cryptocurrency, was proposed in 2009 in a paper entitled "Bitcoin: A Peer-to-Peer Electronic Cash System," listing Satoshi Nakamoto as the author, which is incorporated by reference herein. The details of maintaining and assuring the state of a secure distributed transaction ledger (or block chain) are known in the art and shall not be discussed further herein.

Recently, the technology for secure distributed transaction ledgers has evolved to incorporate a wider range of information. A new generation of decentralized cryptographically verifiable transactions ledgers are emerging that include a Turing Complete computational model; such a model can support smart contracts, among many other things. There is at least one instance of such a system: Ethereum.

Ethereum is very similar to Bitcoin in that it uses a cryptographically verifiable block chain that is extended by proof-of-work, with the longest chain identifying the consensus. It includes a number of improvements that address limitations in how the Bitcoin block chain is extended, and improve the performance and storage requirements of the process. The most significant feature of the Ethereum framework is the inclusion of a "trustful object messaging compute framework." This framework includes the definition of the "Ethereum Virtual Machine" (EVM) and its associated "bytecode" instruction set. The EVM is an abstract stack machine of similar nature to the Java Virtual Machine (JVM) but not the same. Programs written for the EVM may be referred to as "contracts" or "code" and are recorded in the Ethereum block chain.

In Ethereum, these programs can be invoked by "sending" data to their "addresses" (e.g., a 256-bit address), which were specified when they were originally recorded in the ledger. The execution of the computations using the data as input is part of the block chain "mining" process defined for the system. That is, execution of these programs/contracts is performed by block-chain "miners" whenever a transactional message addressed to the contract is recorded in the block chain. The time and resources required to support the execution of a contract are "paid for" through the exchange of a native virtual currency called "Ether." The amount of currency available for a contract's execution may be pre-specified before execution. If that amount is exceeded execution of the contract is aborted, with no results recorded, and full amount of the currency transferred to the miner; this feature avoids problems with infinite loops in execution, or excessive resource utilization; the miner always gets paid. Thus, the result of such execution is either exhaustion of the resources provided for execution, resulting in no output, or the program completes and generates output. In the latter case, the result is returned to the "caller" or originator as another entry in the ledger.

Returning to FIG. 1, one or more information handling systems, such as a computer 115, mobile phone 120, tablet 125, smart package 130, or server 135 may be configured to connect to the distributed peer network 105 to receive a message or messages according to embodiments of the present invention. In embodiments, the devices may be full nodes of the peer-to-peer network in which they perform mining processes, or they may be watching nodes that perform limited functions, embodiments of which are described herein.

As previously mentioned, an area of particular applicability of the present invention is for transmitting configurations, management instructions, and/or commands for large numbers of computing devices. It is useful to communicate with the devices via a secure distributed transaction ledger both for the benefits of using that mechanism as a communicate channel and for providing a means of payment for service performed by the devices—especially if third-party devices.

Figure 2:
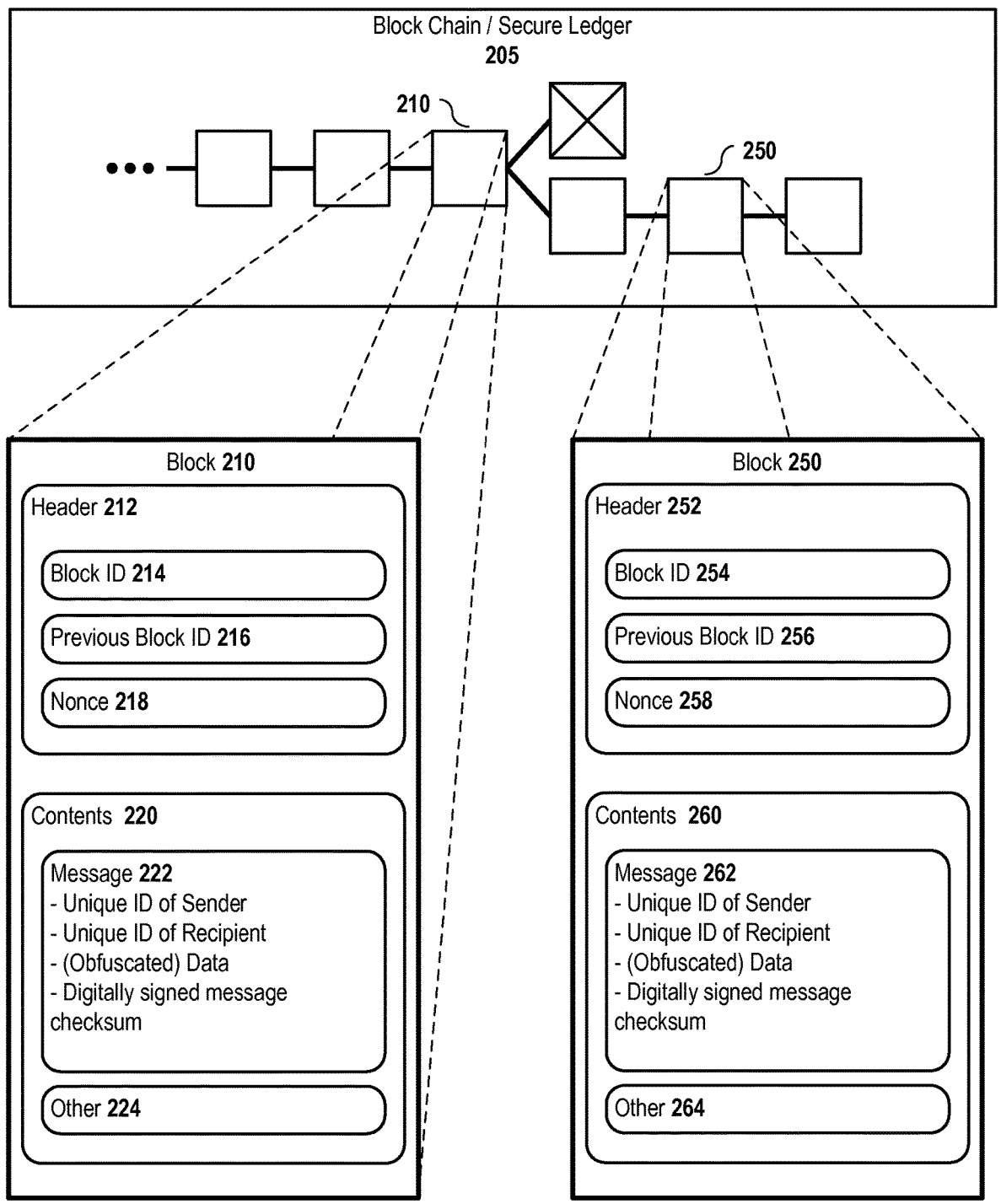
FIG. 2 graphically depicts a block chain or decentralized secure transaction ledger and two sample communications or messages according to embodiments of the present invention.

FIG. 2 depicts example messaging that may be communicated via a distributed secure transaction ledger (or block chain) according to embodiments of the present invention.

C. Block Chain as a Communication Vehicle

In embodiments, a distributed secure transaction ledger, or block chain, may be used to communicate between entities. FIG. 2 graphically depicts a block chain or decentralized secure transaction ledger 205 that is maintained by nodes in a peer-to-peer network. Also depicted in FIG. 2 is an example of two sample communications or messages according to embodiments of the present invention. It shall be noted that using the block chain to communicate information and messages has several benefits. First, messages can be sent to a device, from a device, to a number of devices, from a number of devices, or combinations thereof. Second, it does not rely on a centralized authority. Third, once a message is added to the block chain, it cannot be altered or removed. Fourth, it is decentralized so it is difficult, if not impossible, to block access to it. Fifth, messages can be posted for later retrieval. And sixth, messages can cause automatic execution of actions, such as escrow functions, as part of maintaining the block chain.

In embodiments, the block chain 205 may be used to receive messages from or send messages to a device or devices using the block chain. Consider, by way of example, a message in block 210 of the block chain 205. In embodiments, a block 210 may contain a header 212 and contents 220.

In embodiments, the header 212 comprises a block ID 214 for that block, a block ID 216 of the previous block, and a nonce value 218, which represents the "proof of work." In embodiments, this information is used in linking the block into the block chain.

In embodiments, the contents 220 may comprise one or more messages 222 and may also include other data 224. In embodiments, a message 222 may comprise a unique identifier of the sender of the message (or owner/originator/sender of the message). This information may be used for one or more purposes. For example, the identifier helps the receiving device identify who sent the message. In embodiments, the device may be sent messages from various third parties, but may only take direction from an authorized set of one or more entities. The identifier of the owner or sender also provides a way by which the device can address a response to the sender, if desired. Additionally, the identifier of the owner/sender may be used or linked to an account to pay for processing fees or other fees associated with using the block chain as a communication channel, to perform computations, pay for goods, or other actions. Alternatively, a separate account identifier (not shown) may be specified and used for payment purposes.

In embodiments, the message 222 may include instructions, such as configuration data, management data, and/or instruction-related data, for the device. In embodiments, this data may be a link to the configuration data, management data, and/or instruction-related data, or may be the data itself. In embodiments, the configuration data, management data, and/or instruction-related data may be a program, a container, or a link to data (which data may be a program, container, or raw data). In embodiments, a link to a program (or container) may comprise a unique identifier or an address to a program (or bytecode) in the block chain, may be a link to an application or container available outside the block chain, or a combination thereof. Because this data is publicly in the ledger, the sender may obfuscate some or all of the message data by encrypting it.

In embodiments, the message 222 may include a way or ways for authenticating the message. For example, in embodiments, the message 222 may include a digitally signed message checksum as way to verify the message. For example, the sender of the message may digitally sign a checksum or hash of the message using his or her private key. A receiving device can verify the integrity of the data by verifying the checksum or hash using the sender's public key. Those having skill in the art shall recognize that other methods for verifying the data's integrity may also be employed herein.

It shall be noted that embodiments of the present invention may include the device or devices sending a message. For example, the block chain 205 may be used to send messages regarding the confirmation, configuration status, results information, or other data. Consider, by way of example, a message in block 250 of the block chain 205. In embodiments, a block 250 may contain a header 252 and contents 260.

Like the header 212 discussed with respect to block 210, the header 252 of block 205 comprises a block ID 254 for that block, a block ID 256 of the previous block, and a nonce value 258, which represents the "proof of work."

Similar to the message in the block 210, in embodiments, the contents 260 may comprises one or more messages 262 and may also comprise other data 264. In embodiments, a message 262 may comprise a unique identifier of the recipient of the message, which may be the originator of the initial message 210 or another entity.

In embodiments, the message may include a unique identifier of the submitter of the message. This information may be used for one or more purposes. For example, the identifier helps identify who sent the message. Additionally, the identifier may be used or linked to an account to pay for or receive fees associated with using the block chain as a communication channel, for performing calculations, for providing a good, or other actions. Alternatively, a separate account identifier may be specified and used.

In embodiments, the message 262 includes data (e.g., confirmation of receipt of the message, status, results information, or other data) or a link to the data. In embodiments, some or all of that data may be obfuscated by encryption.

In embodiments, the message 222 may include a digitally signed message checksum as way to verify the message. For example, the sender of the message may digitally sign a checksum or hash of the message using his or her private key. A receiving device can verify the integrity of the data by verifying the checksum or hash using the sender's public key. Those having skill in the art shall recognize that other methods for verifying the data's integrity may also be employed herein.

D. Embodiments of Methods

1. General Overview

In embodiments, implementing virtual commodity contracts market using a secure distributed transaction ledger, or block chain, comprises defining interactions of three roles: Seller, Buyer, and Escrow.

In embodiments, the Seller functions in the role of the provider of a virtual offering (a good or service). An example of a virtual good or commodity may be a digital file that contains content, such as music, video, text, etc. An example of a virtual service is executing a program, which may be a containerized program, and providing the result of the execution.

In embodiments, the Buyer functions in the role of the purchaser of a virtual commodity or service, and the provider of funds in the form of units of the block chain's cryptocurrency. In embodiments, the Buyer also serves the function of validating the reception of the virtual commodity or having received the benefit of the service it purchased.

In embodiments, the Escrow role serves as an intermediary in the transfer of cryptocurrency funds between the Buyer, the Seller, and a potential third party (as discussed below). In embodiments, the Escrow role also serves as a recorder of the various transactions it adjudicates such that a history of the past behaviors of the various parties exists for public scrutiny. This would allow, for instance, a Seller to determine if a particular Buyer is one with which it would like to transact.

In embodiments, the implementation of the Escrow role relies upon the ability to execute programs as part of the block chain mining process. Because the mining process is executed in parallel, in a distributed, non-centralized, manner, the Escrow role itself is not centralized, and so, is not subject to centralized control. All of the code that implements the Escrow may be recorded in the secure distributed transaction ledger, and is open to public inspection; in this way, Sellers and Buyers are free to use one Escrow implementation, or another, based upon the results of their assessment of the trustworthiness of the Escrow's implementation.

In embodiments, in addition to supporting the implementation of the Escrow role, the ledger also serves as a distributed communications channel between all parties. This "channel" allows each role to communicate in a "broadcast mode" in which a "message" may be recorded in the ledger and identified in such a manner that it is addressed to all interested parties, or, alternatively, identified in such a manner that it is addressed to one or more specific parties. In both cases, because the ledger is publicly readable, the contents of all such communications are available to all.

As discussed below with respect to some of the embodiments, one important component is the concept of a "timeout" period on communications between the three roles, and the consequences of a timeout period expiring. The implementation allows completely independent and potentially anonymous parties to interact. There is no guarantee that any one Seller, or any one Buyer, will behave in good faith or, even, to continue to exist, throughout the interaction. A Seller could disappear after a Buyer has provided funds, or a Buyer could "reject" the virtual goods provided after their transmission to the Buyer (with no practical method to revoke the provisioning of the virtual good or service).

Presented below are embodiments of each role in terms of the messages they exchange and the related actions they take. In embodiments, each role is based around a "wait loop" in which the role waits for either the arrival of a message, or a "timeout" (meaning a message did not arrive within a predefined timeout period). If a message is received, then one or more actions are performed based upon the type of message received and the process of waiting for a message restarts. If there is a wait timeout expiration, then a different set of one or more actions are performed; and the process of waiting for a message restarts.

In embodiments, the Seller and the Buyer roles may share similar functions to initiate a transaction to exchange virtual goods or services. For example, they may send a "Proposal Broadcast," which is not targeted at any specific recipient. In embodiments, this message may detail what the party is offering and what the terms are (e.g., price, resources, etc.).

In embodiments, the system may support a negotiation protocol, which may comprise two other messages: "Proposal Counteroffer" and "Proposal Accepted." These messages may be used to refine or finalize an agreement.

In embodiments, a potential agreement may be rejected by disengaging from the exchange by ignoring a message from the other party and letting the exchange timeout. Alternatively, a message may be sent that indicates a party's desire to terminate the negotiations. In either event, this guards against malicious agents who have no intent to conclude an agreement.

In embodiments, the Buyer-Seller interaction may result in an exchange of several messages as the two parties confirm or refine the details of the agreement. It should be noted that once an agreement has been reached, the parties may continue to transfer data via the block chain, or alternatively in some embodiments, via other means. For example, in embodiments, the Buyer and/or Seller may directly transfer data to the other party. Consider the following example. In embodiments, if the Buyer agrees with the Seller for the Seller to perform calculations or operations on data supplied by the Buyer (e.g., render a certain number of frames of an animation), the Buyer needs to provide the data to the Seller. Similarly, the Seller may need to transfer data to the Buyer, such as an agreed-upon virtual good or provide results of a service (e.g., the rendered animation frames), but may not want to send it via the block chain. Thus, in embodiments, especially for large transfers, the party may provide information to the other party on how to obtain (and validate) data or services. For example, the party may provide the MD5 checksum of the data to be retrieved along with a Uniform Resource Locator (URL) address of a server or download site, such as BitTorrent.

In embodiments, when an agreement is reached, the Buyer will send a "Transfer Funds" message to the Escrow role. This message instructs the Escrow to hold funds from the Buyer to be sent to the Seller at a later time if the Seller satisfactorily delivers their part of the agreement. In embodiments, a timeout period is also recorded for the funds after which the Seller may receive the transfer of funds to their account independent of the Buyer's communications, if certain conditions are met. For example, if the Seller has performed its portion of the agreement but no message is ever received by the Escrow from the Buyer authorizing release of the funds, the Seller may request the funds and receive them after a specified period has expired in which the Buyer may express its opposition to the Seller receiving the funds. This procedure protects the Seller from a Buyer who might disappear and be unable to authorize the transfer in the future.

In embodiments, the Escrow sends a "Funds in Escrow" message to the Seller once the Escrow has received the funds from the Buyer. This message triggers the Seller to begin performance under the agreement (e.g., to initialize the transfer of the virtual good, or to initialize the service (e.g., download a container to be executed, such as a Docker container).

In embodiments, when the virtual good or service has been supplied to the Buyer, the Seller sends a "Funds Payout" message to the Escrow. Meanwhile, the Buyer receives the virtual goods or service and decides if it is acceptable. If so, it sends a "Release Funds" message to Escrow, or it sends a "Buyer Rejection" message to the Escrow. If the Buyer does not receive the virtual goods or service within the agreed-upon timeout period, it will send a "Buyer Rejection" message to the Escrow.

In embodiments, when the Escrow receives a "Release Funds" message it will send an "Escrow Funds Payout" message to the Seller, which indicates to the Seller that the escrowed funds have been or will shortly be transferred to the Seller.

In embodiments, when the Escrow receives a "Buyer Rejection" message, it transfers the funds held in the escrow account to the account of a neutral third-party such as a charity; it is not returned to the Buyer. This prevents a Buyer from receiving the agreed-upon goods or service, and then not paying. In embodiments, once the Buyer transfers their funds to Escrow, it never receives the funds back. Alternatively, in embodiments, if an agreement is reached but the Seller never performs or if the Seller consents, the Buyer may have the fund returned by the Escrow.

In embodiments, when the Escrow receives a "Funds Payout Request" from a Seller, it validates the request and sends the "Escrow Funds Payout" message or the "Buyer Rejection" message, as appropriate. If it cannot determine which to send, because the Buyer has not communicated with the Escrow, it records the request and will fulfill it after the timeout period specified in the Transfer Funds message has elapsed. As mentioned, this protects the Seller from a Buyer that receives the goods but does not communicate with Escrow.

It should be noted that the phrase "proposal is of interest" is used in embodiments. This phrase related to filtering multiple proposals and specifying the one or ones that are relevant to a Seller or a Buyer.

In embodiments, the transaction histories of the Sellers and Buyers are available to each and may be used by either to filter Sellers or Buyers they do (or do not) want to engage with. For example, if a particular Buyer frequently sends "Buyer Rejection" messages, a Seller may decide not to deal with such a Buyer; similarly, a Buyer may evaluate whether it wants to engage with a particular Seller. In embodiments, this is represented by the "Buyer Acceptable" and "Seller Acceptable" predicate in the methods discussed below.

It should be noted that in embodiments, the system may support an explicit ranking system or systems. Since the transactions are permanently written into the block chain, an automated rating system may programmatically examine the transactions of a Buyer or a Seller and assign one or more ranking factors based upon the history. For example, the ranking system may evaluate how often there are repeat transactions between the same parties, timing, number of rejections or completions, etc. In embodiments, the system may also support a feedback system in which users may provide rankings and/or comments.

Having provided a general overview of the participants and message passing, specific method embodiments are presented below by way of illustration, and not limitation.

2. Examples of Seller Methods a) Seller—"Listens" for a Message

Figure 3:
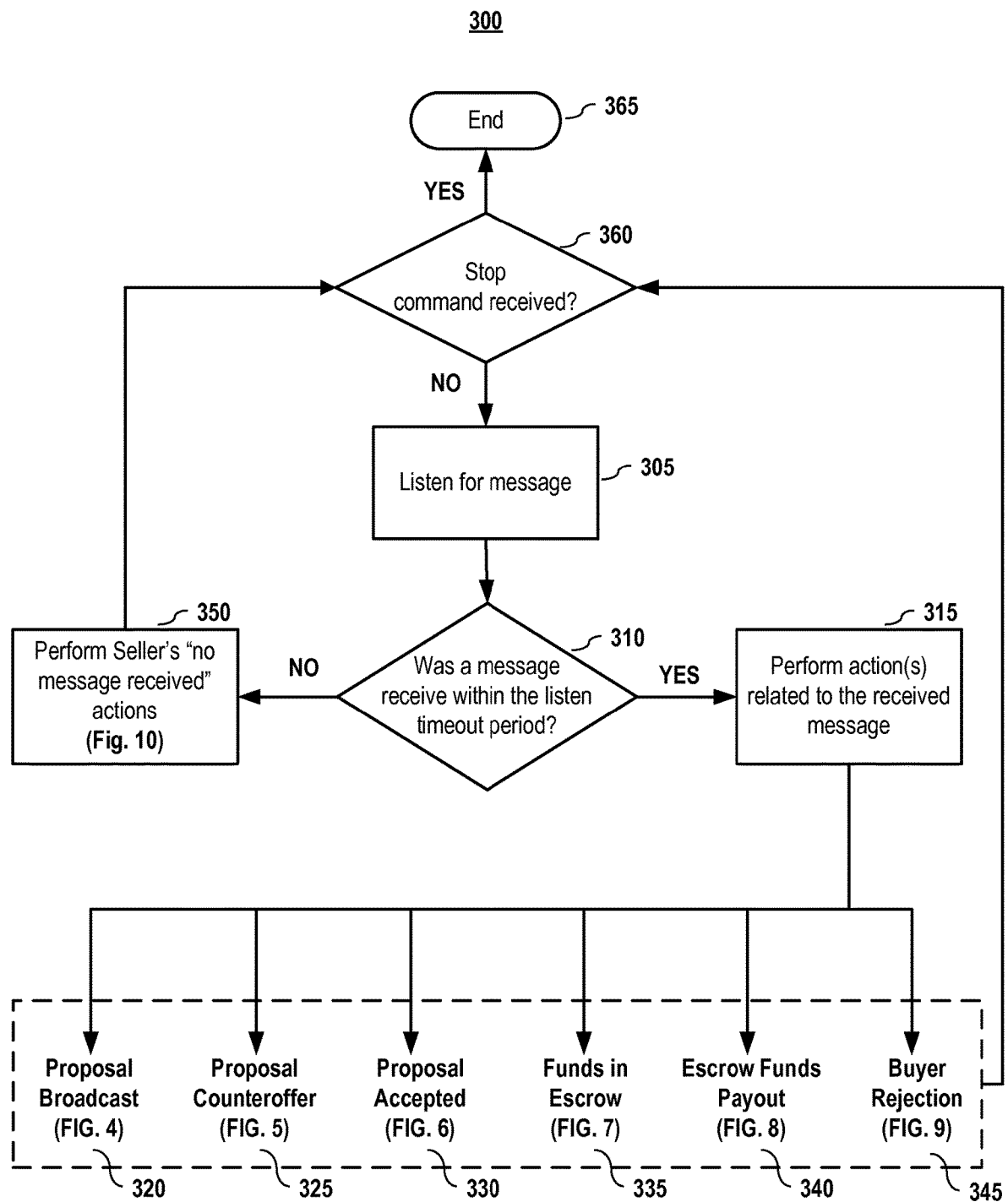
FIG. 3 depicts a method for a Seller according to embodiments of the present invention.

FIG. 3 depicts a method for a Seller according to embodiments of the present invention. As shown in FIG. 3, in embodiments, a Seller, "listens" (305) for a message relevant to it. For example, the Seller examines the block chain to determine whether it contains a message that is relevant to the Seller. If a message was received (310) within a listening timeout period, the Seller performs (315) one or more actions related to the specific message that was received. In embodiments, examples of messages that may be received include: a Proposal Broadcast message 320, a Proposal Counteroffer message 325, a Proposal Accepted message 330, a Funds in Escrow message 335, an Escrow Funds Payout message 340, and a Buyer Rejection message 345. Embodiments of the one or more actions taken 315 as a result a particular message will be described below with reference to FIGS. 4-9.

Responsive to a message not being received (310) within a listening timeout period (i.e., the listening timeout period expired before a message was received), the Seller performs (350) one or more actions, which may be referred to herein as the "no message received" actions. Embodiments of those actions are described below with reference to FIG. 10.

Following completion of actions for a received message or for "no message received," in embodiments, the Seller may check (360) whether a stop command has been received. Responsive to a stop command being received, the process may end (365). Responsive to a stop command not being received, the Seller returns to "listening" (305) for a message and the process repeats.

b) Seller—Proposal Broadcast Message Procedure

Figure 4:
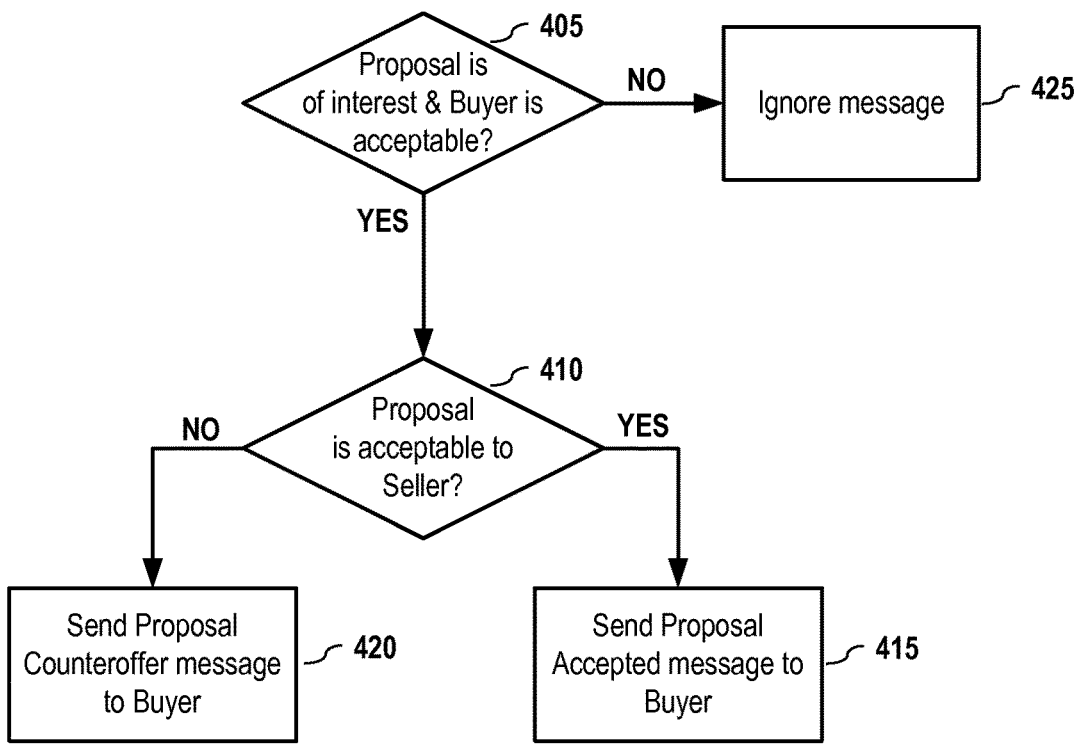
FIG. 4 depicts a method for a Seller who has received a Proposal Broadcast message via a secure distributed transactional ledger according to embodiments of the present invention.

FIG. 4 depicts a method for a Seller who has received a Proposal Broadcast message via a secure distributed transactional ledger according to embodiments of the present invention. In embodiments, a broadcast message may be sent by a Buyer using a secure distributed transaction ledger according to embodiments of the present invention. In embodiments, a Buyer publishes a broadcast message to one or more nodes that participate in a peer-to-peer network for inclusion in a block in the block chain. In embodiments, the broadcast message provides a Seller with offer information, such as what is being requested, pricing, timing, identify of Buyer, etc. It shall be noted that the Buyer's Proposal may be directed to the Seller specifically, or may be directed to a number of potential Sellers, including being broadcast generally.

In embodiments, a Seller, having retrieved the block chain and identified (step 305 in FIG. 3) the Broadcast message, determines whether the message is of interest (405) to the Seller. For example, the Seller may determine whether the requested good or service is one which the Seller can or wants to provide, whether the Seller can provide it within the specified time, etc.

If the Proposal Broadcast message is one that is of interest to the Seller, in embodiments, the Seller may ascertain whether the Buyer is (405) an acceptable party. As discussed previously, the Seller may check the history of the Buyer, may check rankings of the Buyer, and/or may check with a rankings service. As mentioned, the ranking service may be done programmatically and may provide one or more rankings based upon one or more parameters.

Responsive to Proposal Broadcast message being one that is of interest to the Seller and responsive to the Buyer being acceptable as an entity with which to engage, the Seller may determine (410) if the terms in the Proposal Broadcast message are acceptable.

If the terms in the Proposal Broadcast message are acceptable, the Seller may send (415) the Buyer a Proposal Accepted message. In embodiments, the message from the Seller may be sent via the secure distributed transaction ledger.

If one or more terms in the Proposal Broadcast message are not acceptable to the Seller, the Seller may send (420) the Buyer a Proposal Counteroffer message. In embodiments, the Proposal Counteroffer message may be sent via the secure distributed transaction ledger.

Responsive to Proposal Broadcast message being one that is not of interest to the Seller or from a Buyer that is not acceptable to the Seller, the Seller may simply ignore (425) the Proposal Broadcast message.

c) Seller—Proposal Counteroffer Message Procedure

Figure 5:
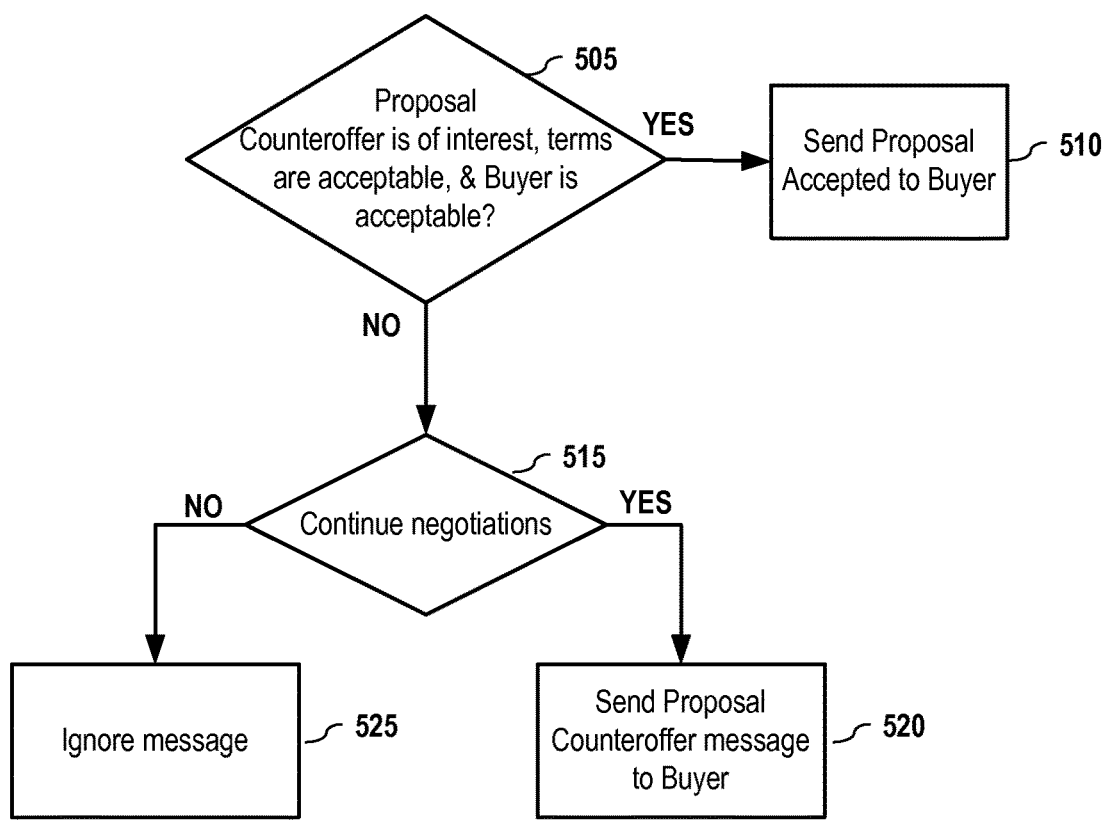
FIG. 5 depicts a method for a Seller who has received a Proposal Counteroffer message via a secure distributed transactional ledger according to embodiments of the present invention.

FIG. 5 depicts a method for a Seller who has received a Proposal Counteroffer message via a secure distributed transactional ledger according to embodiments of the present invention. In embodiments, the Seller may have sent an initial Proposal Broadcast message or may have sent a Proposal Counteroffer message, either of which may result in a Buyer sending a Proposal Counteroffer message.

In embodiments, the Seller determines whether the message is of interest (505) to the Seller (i.e., the message is relevant to the Seller) and whether the counteroffer terms are acceptable (505). In embodiments, the Seller may also ascertain whether the Buyer is (505) an acceptable party. In embodiments, if this Proposal Counteroffer message is a response to a prior message from the Seller, whereby the Seller already knows the Buyer and has decided to interact with the Buyer, this condition may be skipped.

Responsive to the Proposal Counteroffer message being one that is of interest to the Seller, and the terms and the Buyer are acceptable to the Seller, the Seller replies (510) by sending a Proposal Accepted message to the Buyer. In embodiments, the Proposal Accepted message may be sent to the Buyer via the secure distributed transaction ledger.

Responsive to the Proposal Counteroffer message being one that is of interest to the Seller and the Buyer is acceptable, but one or more of the terms are not acceptable to the Seller, the Seller may decide (515) whether to continue to negotiate with the Buyer.

If one or more terms in the Proposal Broadcast message are not acceptable to the Seller and the Seller wants to continue negotiations, the Seller may send (520) the Buyer a Proposal Counteroffer message. In embodiments, the Proposal Counteroffer message may be sent via the secure distributed transaction ledger.

If, however, the Seller does not want to continue negotiations, the Seller may ignore (525) the Proposal Counteroffer message. In embodiments, lack of a response from the Seller within a set time will signal to the Buyer that the negotiations have been terminated. Alternatively, the Seller may send a termination message to the Buyer.

d) Seller—Proposal Accepted Message Procedure

Figure 6:
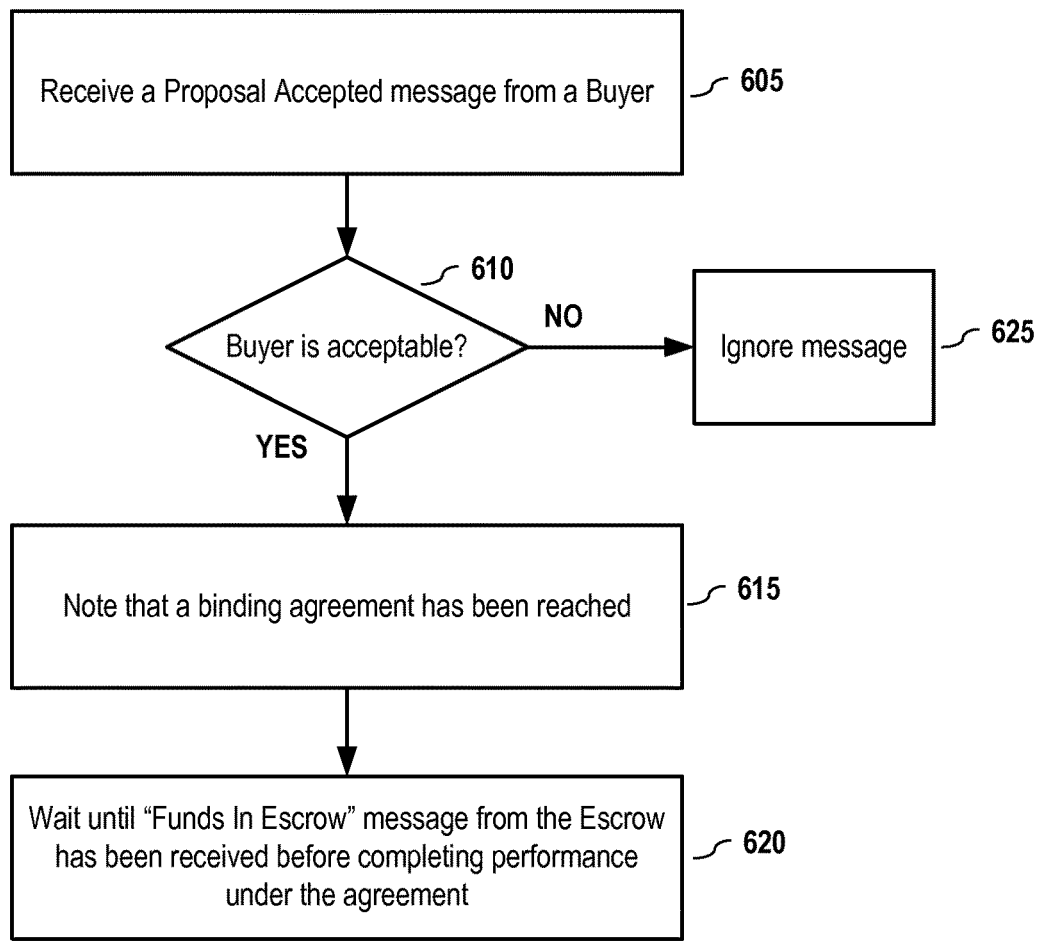
FIG. 6 depicts a method for a Seller who has received a Proposal Accepted message via a secure distributed transactional ledger according to embodiments of the present invention.

FIG. 6 depicts a method for a Seller who has received a Proposal Accepted message via a secure distributed transactional ledger according to embodiments of the present invention.

In embodiments, the Seller may receive (605) a Proposal Accepted message from the Buyer. The Proposal Accepted message is in response to a Proposal Broadcast or Proposal Counteroffer from the Seller. In embodiments, the Proposal, particularly a Proposal Broadcast, may be made conditional. For example, the Seller may indicate that the offer is conditional upon acceptable by the Seller of the Buyer. Because a Proposal Broadcast may go to a number of unknown Buyers, the Seller may want to make the Proposal Broadcast offer conditioned upon the Seller's approval of the Buyer once identified to the Seller in the Proposal Accepted message. Thus, in embodiments, the Seller may determine (610) whether the Buyer is acceptable. If the Buyer is not acceptable, the Seller may ignore (625) the Proposal Accepted or may send a message indicating the same to the Buyer.

If acceptable, the Seller may note (615) that a binding agreement has been reached. In embodiments, the Seller may want to note that the agreement has been reached for various reasons, including starting performance under the agreement or setting aside, if prudent, resources associated with agreement so that when performance under the agreement is required the Seller has the capability to complete its portion of the agreement. In embodiments, if the Buyer fails to perform, the set-aside resources may be released to be used or sold elsewhere and/or the Seller may take one or more actions to obtain redress for breach of the agreement by the Buyer. In embodiments, noting that agreement has been reach may include sending a Proposal Accepted message to the Buyer.

In embodiments, to help protect itself, the Seller waits (620) until the Escrow notifies it that the Buyer's payment has been received and is in an escrow account. In embodiments, the Escrow notifies the Seller by sending it a Funds In Escrow message, which confirms receipt by the Escrow from the Buyer of the amount due under the agreement.

e) Seller—Funds In Escrow Message Procedure

Figure 7:
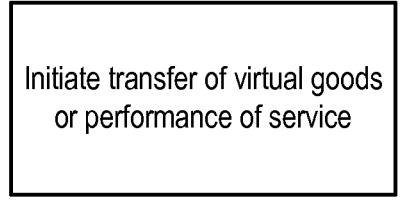
FIG. 7 depicts a method for a Seller who has received a Funds in Escrow message via a secure distributed transactional ledger according to embodiments of the present invention.

FIG. 7 depicts a method for a Seller who has received a Funds in Escrow message via a secure distributed transactional ledger according to embodiments of the present invention. In embodiments, once an agreement has been reached and the funds for the agreement have been received by the Escrow, the Funds in Escrow message received by the Seller is a trigger for the Seller to begin performance. For example, the Seller will begin (700) the transfer of the agreed-upon virtual good or begin performance of the agreed-upon service.

f) Seller—Escrow Funds Payout Message Procedure

Figure 8:
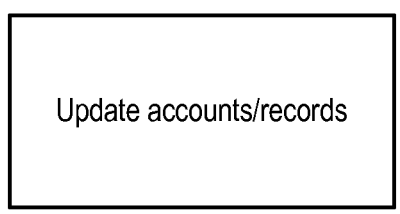
FIG. 8 depicts a method for a Seller who has received an Escrow Funds Payout message via a secure distributed transactional ledger according to embodiments of the present invention.

FIG. 8 depicts a method for a Seller who has received an Escrow Funds Payout message via a secure distributed transactional ledger according to embodiments of the present invention. In embodiments, upon payment of the funds in escrow, the Escrow notifies the Seller by providing an Escrow Funds Payout message. In embodiments, this message indicates the Buyer, the particular agreement, the agreed-upon price, and the like. In embodiments, the Seller may use this information to update (800) its own accounts and/or records.

g) Seller—Buyer Rejection Message Procedure

Figure 9:
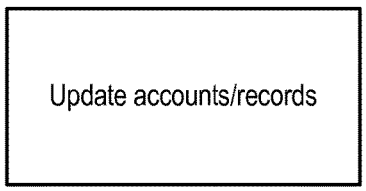
FIG. 9 depicts a method for a Seller who has received a Buyer Rejection message via a secure distributed transactional ledger according to embodiments of the present invention.

FIG. 9 depicts a method for a Seller who has received a Buyer Rejection message via a secure distributed transactional ledger according to embodiments of the present invention. In embodiments, if the funds in escrow are not going to be paid to the Seller, the Escrow notifies the Seller by providing a Buyer Rejection message, which may include data relevant to the particular agreement, such as an identifier of the agreement, an identifier of the Buyer, the agreed-upon price, and the like. In embodiments, the Seller may use this information to update (900) its own accounts and/or records. For example, if the Seller operates an accrual basis accounting and booked the revenue for performing under the agreement, it may correct its accounts/records to reflect that it will not receive payment.

h) Seller—"No Message Received" Procedure

Figure 10:
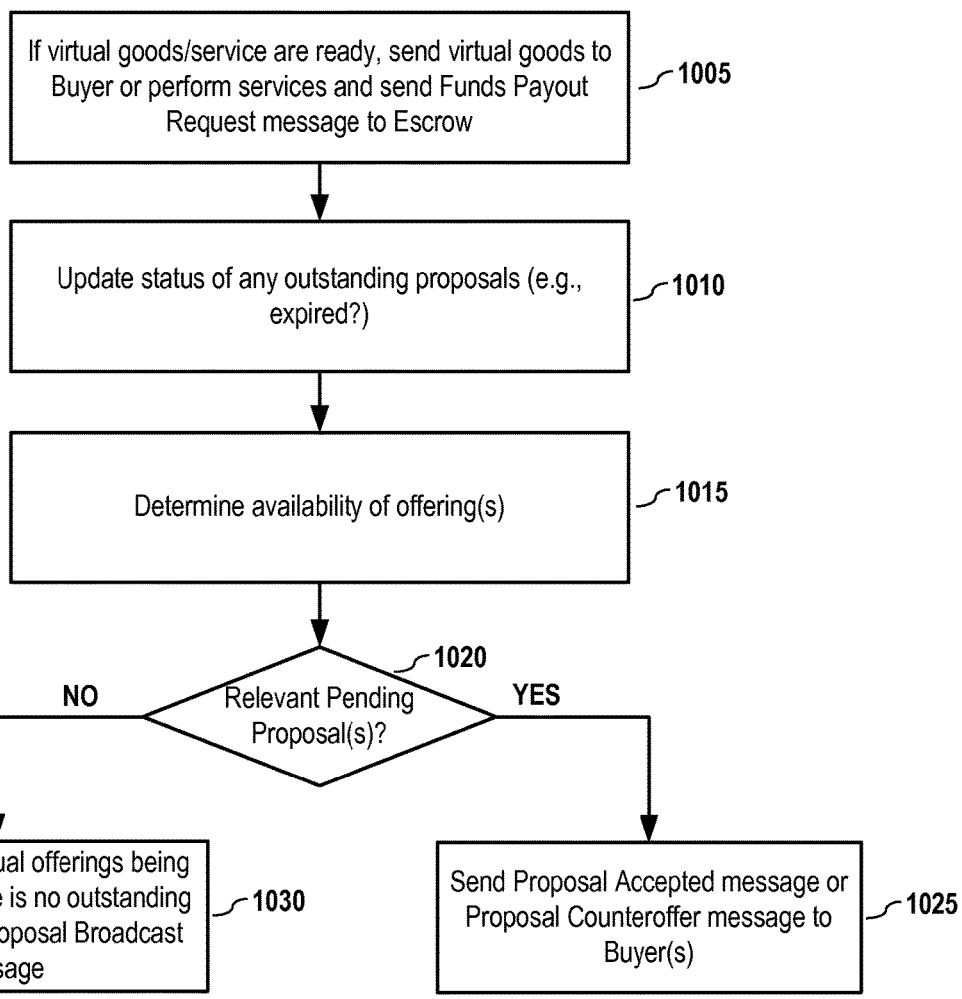
FIG. 10 depicts a method for a Seller who has not received any messages via a secure distributed transactional ledger within a set period according to embodiments of the present invention.

FIG. 10 depicts a method for a Seller who has not received any messages via a secure distributed transactional ledger within a set period according to embodiments of the present invention. Because acquiring or preparing the virtual good or performing the service may take time, the Seller checks (1005) to determine if any pending transaction virtual good or services are ready. In embodiments, if the goods or services are ready, the Seller sends (1005) the good(s) to the Buyer or performs the agreed-upon services and sends (1005) a Funds Payout Request message to the Escrow.

In embodiments, the Seller may also update (1010) the status of any outstanding proposals. For example, the Seller may determine whether a proposal (i.e., Proposal Broadcasts, Proposal Counteroffers, or both) have expired, should be rebroadcast, should be rebroadcast with one or more different terms, should be terminated, whether a reminder/tickler message should be sent, etc.

In embodiments, the Seller may also determine (1015) the availability of offering(s). For example, the Seller may ascertain that more of its resources have become available, and therefore, it can offer more services or goods (i.e., virtual offerings).

In embodiments, if Seller has goods or services that are available, the Seller may determine (1020) whether a Buyer or Buyers have made requests (e.g., Proposals) for such services or goods. In embodiments, if there is or are pending Proposals, the Seller may respond (1025) with either an Acceptance or a Proposal Counteroffer, as previously discussed.

If the Seller has virtual offerings available but there are no outstanding proposals related to those virtual offerings, the Seller may send (1030) a Proposal Broadcast message, as previously discussed with respect to FIG. 4.

3. Examples of Buyer Methods a) Buyer—"Listens" for a Message

Figure 11:
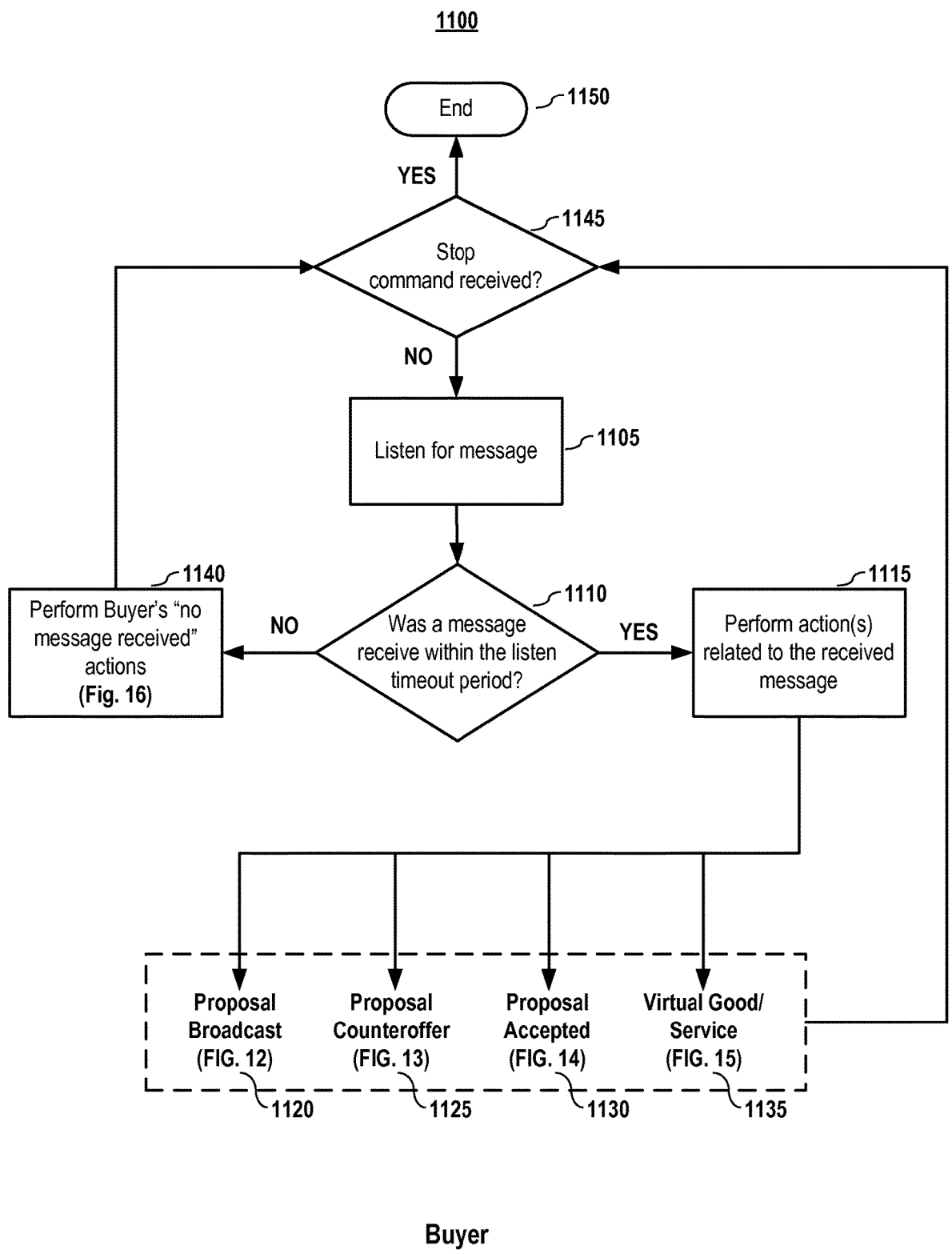
FIG. 11 depicts a method for a Buyer according to embodiments of the present invention.

FIG. 11 depicts a method for a Buyer according to embodiments of the present invention. As shown in FIG. 11, in embodiments, a Buyer, "listens" (1105) for a message relevant to it. For example, the Buyer examines the block chain to determine whether it contains a message that is relevant to it. If a message was received (1110) within a listening timeout period, the Buyer performs (1115) one or more actions related to the specific message that was received. In embodiments, examples of messages that may be received include: a Proposal Broadcast message 1120, a Proposal Counteroffer message 1125, a Proposal Accepted message 1130, and a Virtual Good(s) and/or Service 1135. Embodiments of the one or more actions taken (1115) as a result a particular message or receipt virtual goods or services will be described below with reference to FIGS. 12-15.

Responsive to a message not being received (1110) within a listening timeout period (i.e., the listening timeout period expired before a message was received), the Buyer performs (1140) one or more actions, which may be referred to herein as the "no message received" actions. Embodiments of those actions are described below with reference to FIG. 16.

Following completion of actions for a received message or for "no message received," in embodiments, the Buyer may check (1145) whether a stop command has been received. Responsive to a stop command being received, the process ends (1150). Responsive to a stop command not being received, the Buyer returns to "listening" (1105) for a message.

b) Buyer—Proposal Broadcast Message Procedure

Figure 12:
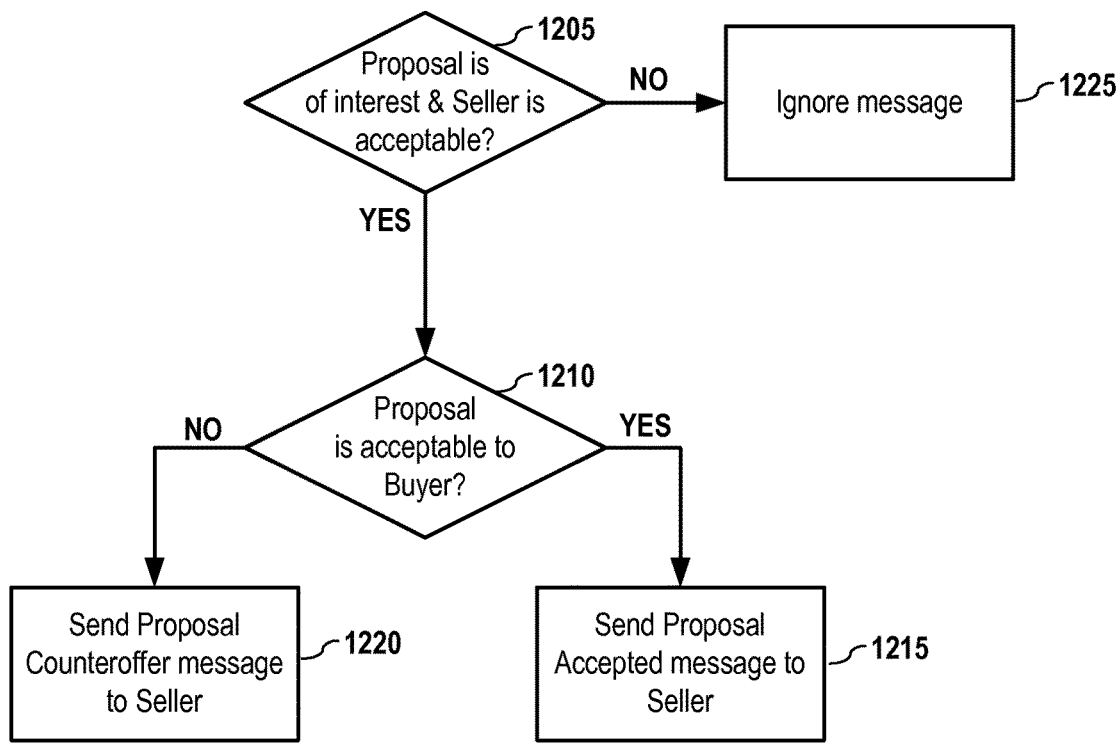
FIG. 12 depicts a method for a Buyer who has received a Proposal Broadcast message via a secure distributed transactional ledger according to embodiments of the present invention.

FIG. 12 depicts a method for a Buyer who has received a Proposal Broadcast message via a secure distributed transactional ledger according to embodiments of the present invention. In embodiments, a broadcast message may be sent by a Seller using a secure distributed transaction ledger according to embodiments of the present invention. In embodiments, a Seller publishes a broadcast message to one or more nodes that participate in a peer-to-peer network for inclusion in a block in the block chain. In embodiments, the broadcast message provides a Buyer with offer information, such as what is being offered, pricing, timing, identify of Seller, etc. It shall be noted that the Seller's Proposal may be directed to the Buyer specifically, or may be directed to a number of potential Buyers, including being broadcast generally.

In embodiments, a Buyer, having retrieved the block chain and identified (step 1105 in FIG. 11) the Broadcast message, determines whether the message is of interest (1205) to the Buyer. For example, the Buyer may determine whether the offered good or service is one which the Buyer wants.

If the Proposal Broadcast message is one that is of interest to the Buyer, in embodiments, the Buyer may ascertain whether the Seller is (1205) an acceptable party. As discussed previously, the Buyer may check the history of the Seller in the secure distributed transaction ledger, may check rankings of the Seller, and/or may check with a service that provides rankings.

Responsive to Proposal Broadcast message being one that is of interest to the Buyer and responsive to the Seller being acceptable as an entity with which to engage, the Buyer may determine (1210) if the terms in the Proposal Broadcast message are acceptable.

If the terms in the Proposal Broadcast message are acceptable, the Buyer may send (1215) the Seller a Proposal Accepted message. In embodiments, the message to the Seller may be sent via the secure distributed transaction ledger.

If one or more terms in the Proposal Broadcast message are not acceptable to the Buyer, the Buyer may send (1220) the Seller a Proposal Counteroffer message. In embodiments, the Proposal Counteroffer message may be sent via the secure distributed transaction ledger.

Responsive to Proposal Broadcast message being one that is not of interest to the Buyer or from a Seller that is not acceptable to the Buyer, the Buyer may simply ignore (1225) the Proposal Broadcast message.

c) Buyer—Proposal Counteroffer Message Procedure

Figure 13:
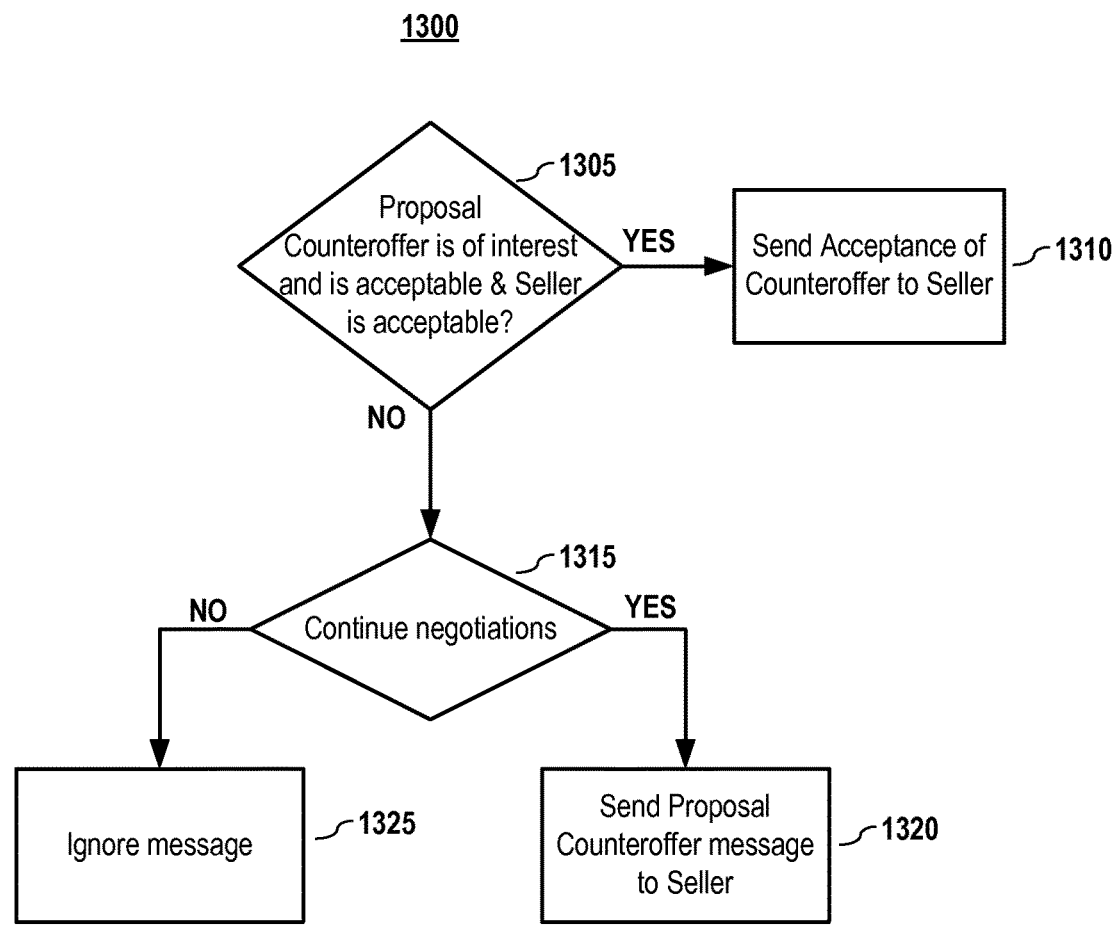
FIG. 13 depicts a method for a Buyer who has received a Proposal Counteroffer message via a secure distributed transactional ledger according to embodiments of the present invention.

FIG. 13 depicts a method for a Buyer who has received a Proposal Counteroffer message via a secure distributed transactional ledger according to embodiments of the present invention. In embodiments, the Buyer may have sent an initial Proposal Broadcast message or may have sent a Proposal Counteroffer message, either of which may result in a Seller sending a Proposal Counteroffer message.

In embodiments, the Buyer determines whether the message is of interest (1305) to the Buyer (i.e., the message is relevant to the Buyer) and whether the counteroffer terms are acceptable (1305). In embodiments, the Buyer may also ascertain whether the Seller is (1305) an acceptable party. In embodiments, if this Proposal Counteroffer message is a response to a prior message from the Buyer, whereby the Buyer already knows the Seller and has decided to interact with the Seller, this step may be skipped.

Responsive to the Proposal Counteroffer message being one that is of interest to the Buyer and the terms are acceptable to the Buyer, the Buyer replies (1310) by sending a Proposal Accepted message to the Seller. In embodiments, the Proposal Accepted message may be sent to the Seller via the secure distributed transaction ledger.

Responsive to the Proposal Counteroffer message being one that is of interest to the Buyer but one or more of the terms are not acceptable to the Buyer, the Buyer may decide (1315) whether to continue to negotiate with the Seller.

If one or more terms in the Proposal Broadcast message are not acceptable to the Buyer and the Buyer wants to continue negotiations, the Buyer may send (1320) the Seller a Proposal Counteroffer message. In embodiments, the Proposal Counteroffer message may be sent via the secure distributed transaction ledger.

If, however, the Buyer does not want to continue negotiations, the Buyer may ignore (1325) the Proposal Counteroffer message. In embodiments, lack of a response from the Buyer within a set time will signal to the Seller that the negotiations have been terminated. Alternatively, a message could be sent to notifying of the termination of the negotiations.

d) Buyer—Proposal Accepted Message Procedure

Figure 14:
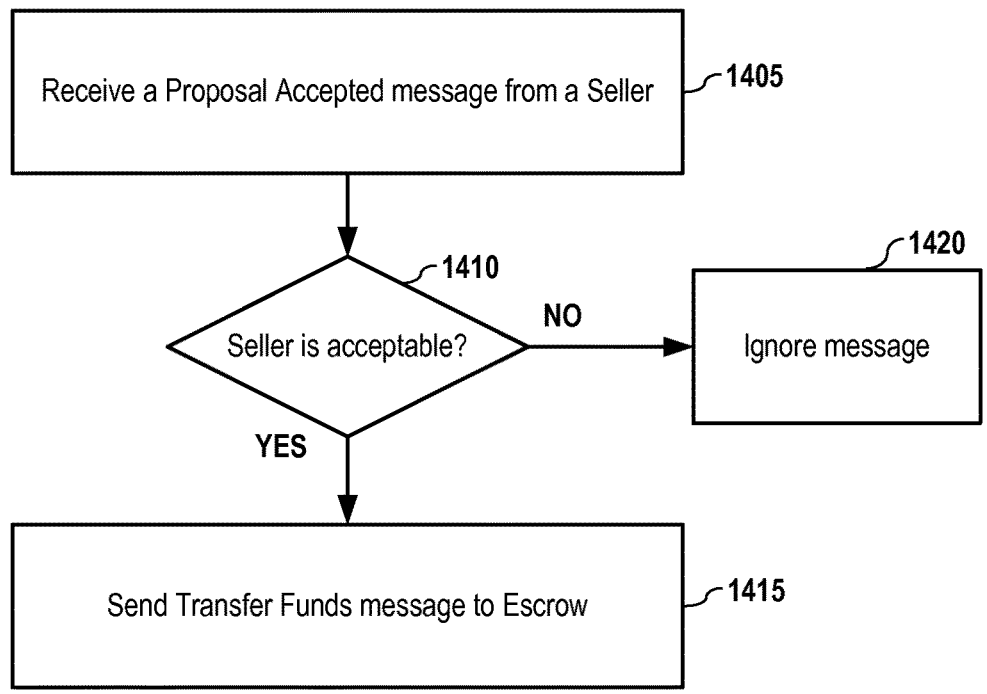
FIG. 14 depicts a method for a Buyer who has received a Proposal Accepted message via a secure distributed transactional ledger according to embodiments of the present invention.

FIG. 14 depicts a method for a Buyer who has received a Proposal Accepted message via a secure distributed transactional ledger according to embodiments of the present invention. In embodiments, the Buyer receives (1405) a Proposal Accepted message, which is a response by a Seller to a Proposal Broadcast or Proposal Counteroffer made by the Buyer. In embodiments, a Proposal, particularly a Proposal Broadcast made by the Buyer, may be conditional. For example, the Buyer may require that any Proposal Accepted message it receives will only form a binding contract once the Buyer has accepted the Proposal Accepted message. In this way, the Buyer has the opportunity, especially if the Proposal Accepted message is the first time the Buyer knows the Seller's identify, to determine (1410) whether the Seller would be a good party to the agreement. If the Buyer does not find the Seller acceptable, in embodiments, the Buyer may ignore (1420) the message, which signals to the Seller that no agreement was reached. Alternatively, the Buyer may send a message to the Seller indicating no agreement was formed.

In embodiments, responsive to the Buyer finding (1410) the Seller acceptable, a binding agreement has been reached, and the Buyer sends (1415) a Transfer Funds message to the Escrow. In embodiments, the Transfer Funds message causes the appropriate amount per the agreement to be transferred from the Buyer's account to an escrow account.

e) Buyer—Virtual Good/Service Received Procedure

Figure 15:
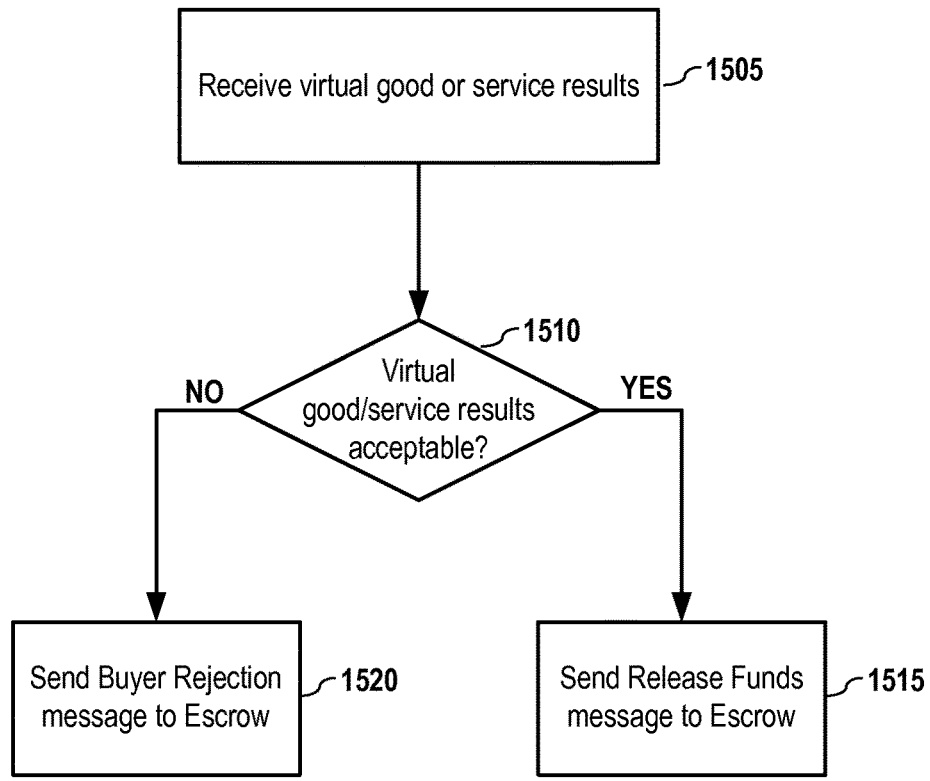
FIG. 15 depicts a method for a Buyer who has received a virtual good or service from the seller according to embodiments of the present invention.

FIG. 15 depicts a method for a Buyer who has received a virtual good or service from the Seller according to embodiments of the present invention. In embodiments, as part of fulfilling its portion of the agreement, the Seller transmits the virtual good(s) or supplies the agreed-upon services. When the Buyer has received (1505) the virtual good(s) or the performance of the service, the Buyer may determine (1510) whether the virtual good(s) or the performance of the service is acceptable to the Buyer.

In embodiments, responsive to the virtual good(s) or the performance of the service being acceptable, the Buyer sends (1515) a Release Funds message to the Escrow. As described in more detail below, this message causes the Escrow to transfer the escrowed funds to the Seller.

In embodiments, responsive to the virtual good(s) or the performance of the service being not acceptable, the Buyer sends (1520) a Buyer Rejection message to the Escrow. As described in more detail below, this message causes the Escrow to transfer the escrowed funds to a third party, such as a charity.

f) Buyer—"No Message Received" Procedure

Figure 16:
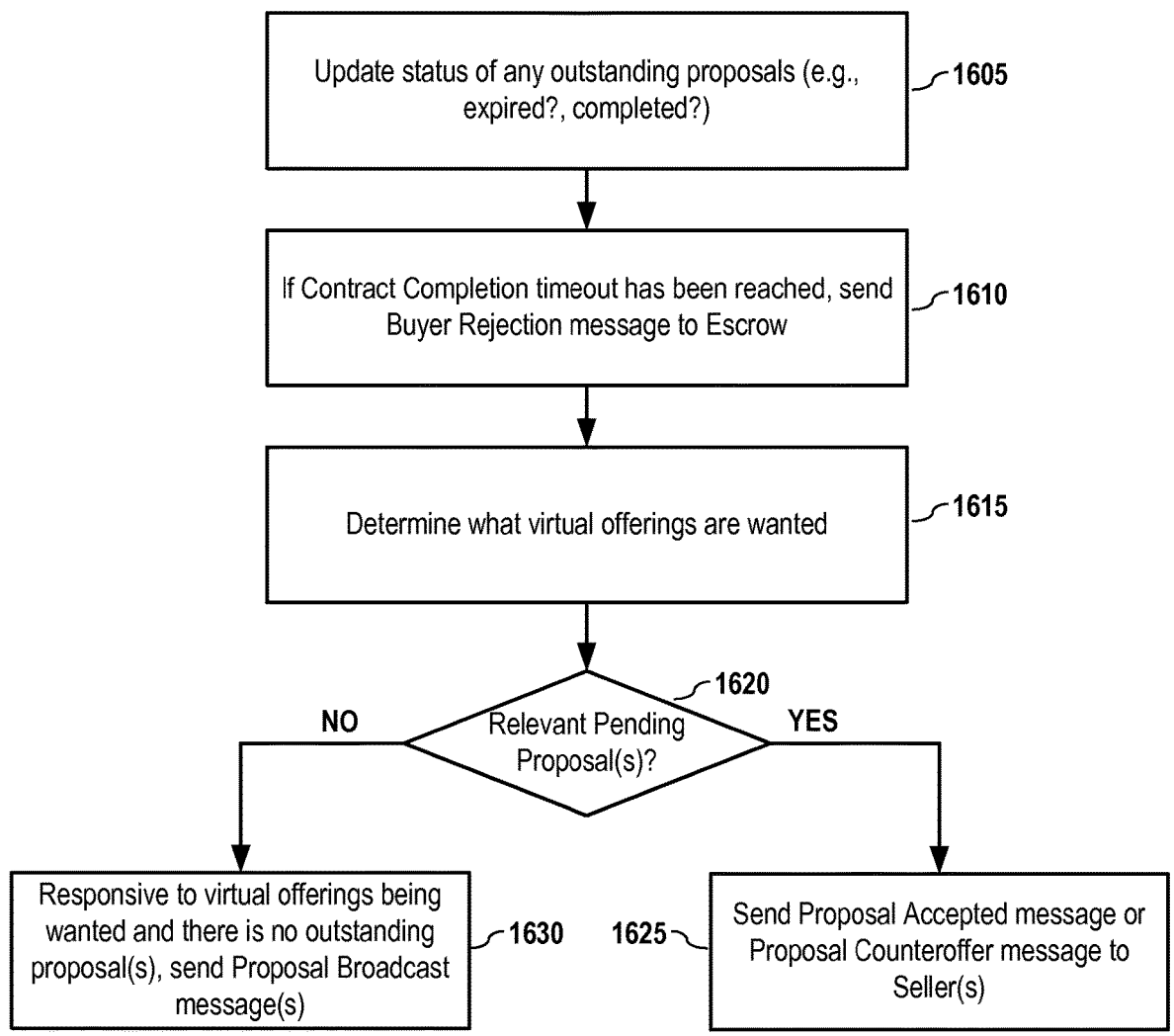
FIG. 16 depicts a method for a Buyer who has not received any messages via a secure distributed transactional ledger within a set period according to embodiments of the present invention.

FIG. 16 depicts a method for a Buyer who has not received any messages via a secure distributed transactional ledger within a set period according to embodiments of the present invention.

It should be noted that embodiments of the marketplace disclosed herein may include certain time periods. For example, time periods may include: a time period for when a Proposal is valid and can be accepted, listening time periods, response time periods, contract completion time periods, payment time periods—among others. In embodiments, one or more of these values may be set by default, may be user-selected, and/or may be negotiated by the parties. In embodiments, one of the time-related values is a Contract Completion time period by which the Seller has to complete performance under an agreement. In embodiments, another time period is an Escrow Payout period, which typically would be longer in duration than the Contract Completion time period, and deals with a time period after which the Seller has performed but the Buyer has not responded—the interplay between the Contract Completion and Escrow Payout periods will be explained in more detail below.

In embodiments, the Buyer may also update (1605) the status of any outstanding proposals. For example, the Buyer may determine whether any proposals (i.e., Proposal Broadcasts, Proposal Counteroffers, or both) have expired, should be rebroadcast, should be rebroadcast with one or more different terms, should be terminated, whether a reminder/tickler message should be sent, whether any contracts have been completed, whether any contracts should have been completed, etc.

In embodiments, if a Contract Completion timeout for an agreement has been reached but the Seller has not performed, the Buyer sends (1610) a Buyer Rejection message to the Escrow. The Contract Completion timeout period is the time period by which the Seller had to perform under the agreement. In embodiments, if the Seller fails to complete performance by the end of the Contract Completion, the Buyer may communicate with the Seller and negotiate an extension. However, the Seller may no longer exist or may not be able to complete performance. Thus, in embodiments, the Buyer may send a Buyer Rejection message to the Escrow to stop payment from going to the Seller.

In embodiments, the Buyer may also determine (1615) whether it wants any virtual offering(s). For example, the Buyer may decide that it wants more computing resources, more storage, a particular file, etc. If the Buyer decides that it wants certain virtual goods/services, it may then determine (1620) whether there are any outstanding proposals that are relevant.

Responsive to there being a relevant proposal or proposals, the Buyer may respond (1625) with either an Acceptance or a Proposal Counteroffer, as previously discussed above.

Responsive to there not being any relevant proposals, the Buyer may send (1630) one or more Proposal Broadcast messages with the associated requirements for the desired virtual offerings (e.g., cost, timing, procedures, etc.), as previously discussed above.

4. Examples of Escrow Methods a) Escrow—"Listens" for a Message

Figure 17:
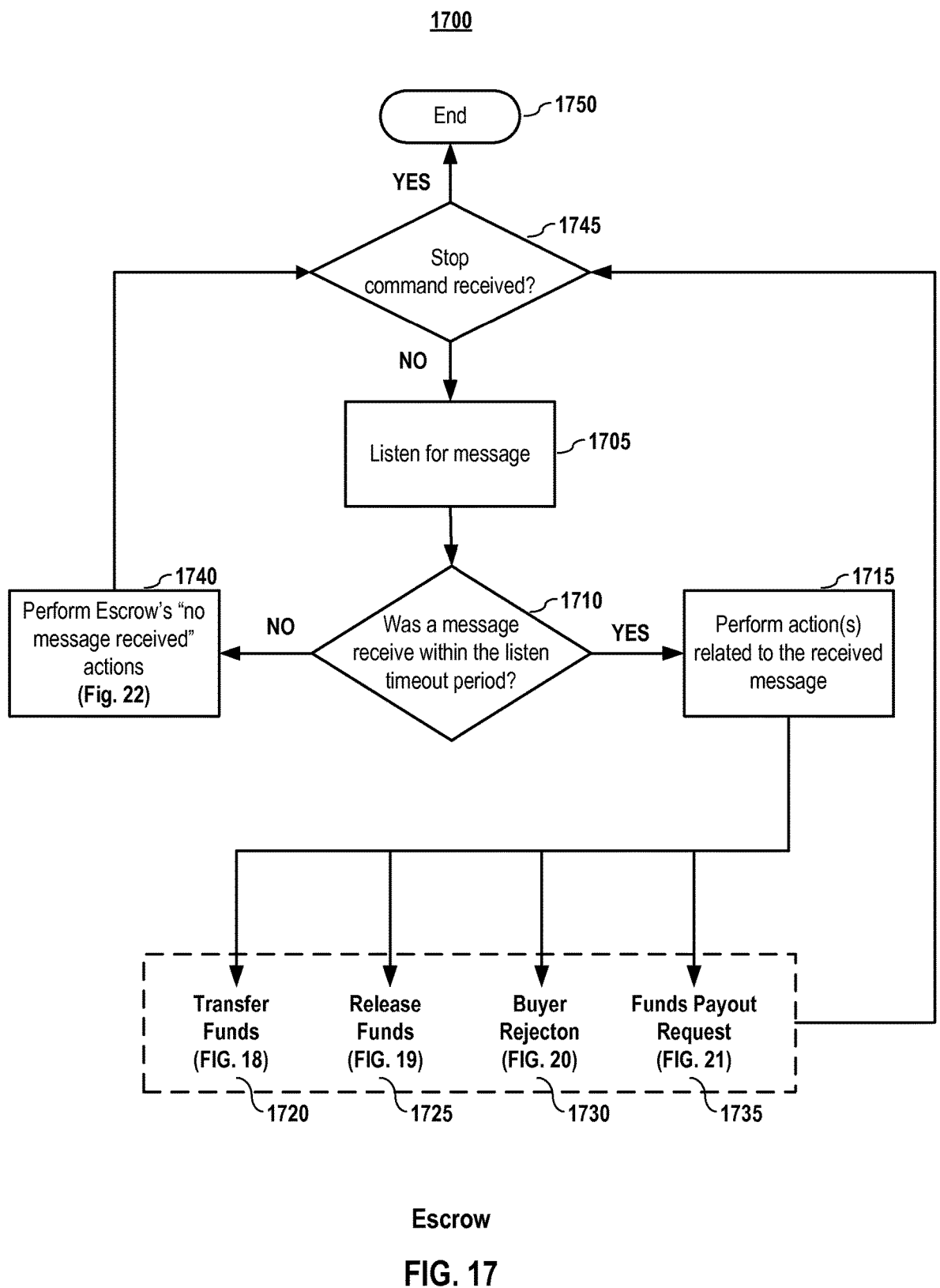
FIG. 17 depicts a method for an Escrow according to embodiments of the present invention.

FIG. 17 depicts a method for an Escrow according to embodiments of the present invention. As shown in FIG. 17, in embodiments, the Escrow "listens" (1705) for a message relevant to it. For example, the Escrow examines the block chain to determine whether it contains a message that is relevant to it. If a message was received (1710) within a listening timeout period, the Escrow performs (1715) one or more actions related to the specific message that was received. In embodiments, examples of messages that may be received include: a Transfer Fund message 1720, a Release Funds message 1725, a Buyer Rejection message 1730, and a Funds Payout Request message 1735. Embodiments of the one or more actions taken (1715) as a result a particular message will be described below with reference to FIGS. 18-21.

Responsive to a message not being received (1710) within a listening timeout period (i.e., the listening timeout period expired before a message was received), the Escrow performs (1740) one or more actions, which may be referred to herein as the "no message received" actions. Embodiments of those actions are described below with reference to FIG. 22.

Following completion of actions for a received message or for "no message received," in embodiments, the Escrow may check (1745) whether a stop command has been received. Responsive to a stop command being received, the process ends (1750). Responsive to a stop command not being received, the Escrow returns to "listening" (1705) for one or more messages.

b) Escrow—Transfer Funds Message Procedure

Figure 18:
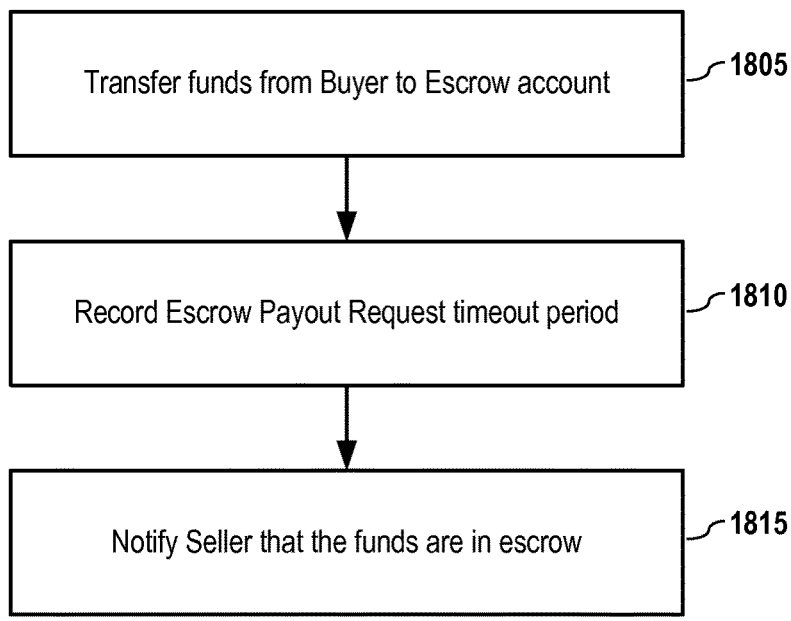
FIG. 18 depicts a method for an Escrow which has received a Transfer Funds message via a secure distributed transactional ledger according to embodiments of the present invention.

FIG. 18 depicts a method for the Escrow who has received a Transfer Funds message via a secure distributed transactional ledger according to embodiments of the present invention. In embodiments, after receipt of a Transfer Funds message from a Buyer, the Escrow transfers (1805) the appropriate amount of funds as indicated in the message from the Buyer's account to an escrow account.

In embodiments, the Escrow records or otherwise notes (1810) what the Escrow Payout Request timeout period is for this agreement. As referenced above, the Escrow Payout Request timeout period is a time period set in the agreement after which the Seller can receive payment from the escrow account if the Seller has performed under the agreement and the Buyer has not timely sent a Buyer Rejection message.

In embodiments, the Escrow notifies (1815) the Seller that the funds for this agreement are in escrow. In embodiments, this message is a trigger for the Seller to commence performance under the agreement.

c) Escrow—Release Funds Procedure

Figure 19:
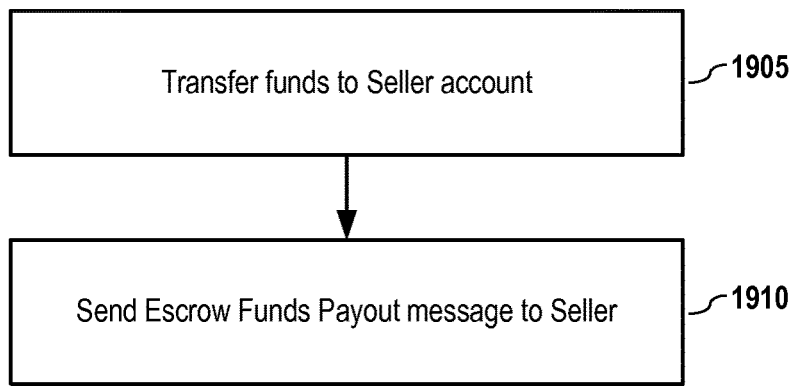
FIG. 19 depicts a method for an Escrow which has received a Release Funds message via a secure distributed transactional ledger within a set period according to embodiments of the present invention.

FIG. 19 depicts a method for the Escrow which has received a Release Funds message via a secure distributed transactional ledger according to embodiments of the present invention. In embodiments, after receipt of a Release Funds message from a Buyer, the Escrow transfers (1905) the escrowed funds to the Seller's account. In embodiments, the Escrow may also send (1910) the Seller an Escrow Funds Payout message to notify the Seller that it has attended to the transfer.

d) Escrow—Buyer Rejection Message Procedure

Figure 20:
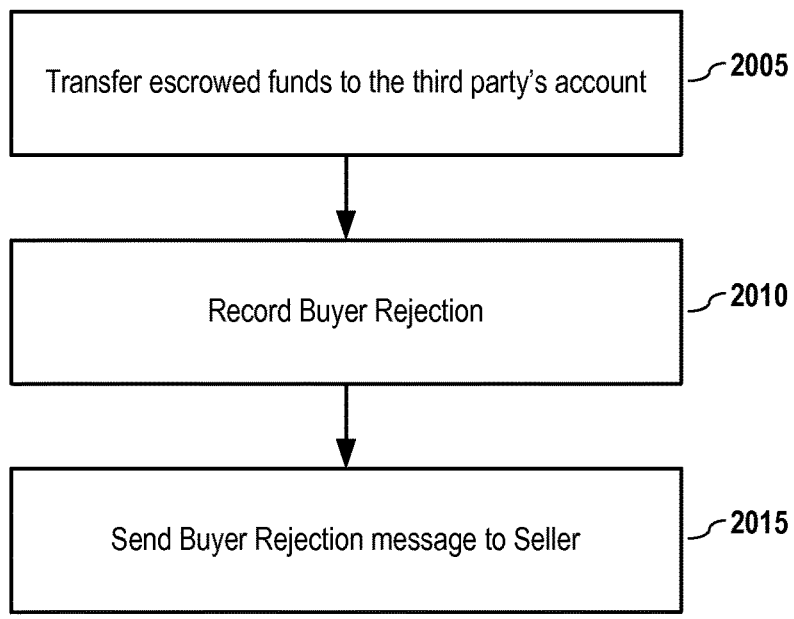
FIG. 20 depicts a method for an Escrow which has received a Buyer Rejection message via a secure distributed transactional ledger according to embodiments of the present invention.

FIG. 20 depicts a method for the Escrow which has received a Buyer Rejection message via a secure distributed transactional ledger within a set period according to embodiments of the present invention. In embodiments, if the Buyer did not received the agreed-upon goods or services from the Seller or the agreed-upon goods or services were deemed by the Buyer to be deficient, the Buyer sends a Buyer Rejection message to the Escrow. In embodiments, after receipt of the Buyer Rejection message, the Escrow transfers (2005) the escrowed funds to a third party's account. The third party can be a charity or some other entity. In embodiments, who the third party is may be set as a default or may be negotiated by the Buyer and Seller as part of establishing the agreement. A benefit of having the escrowed funds transferred to a third party, rather than reverting to the Buyer, helps keep the Buyer from accepting valid goods or services and then cheating the Seller of the payment.

In embodiments, the Escrow records (2010) the Buyer Rejection, which may be recorded in the block chain. Because the information is in the block chain, it is viewable by all and can be used by an application or an individual in accessing the Buyer and/or the Seller of the agreement. In embodiments, the Escrow may also send (2015) a message to the Seller that the Buyer has issued a Buyer Rejection message and that the funds were transferred, not to the Seller, but to a third party.

e) Escrow—Funds Payout Request Procedure

Figure 21:
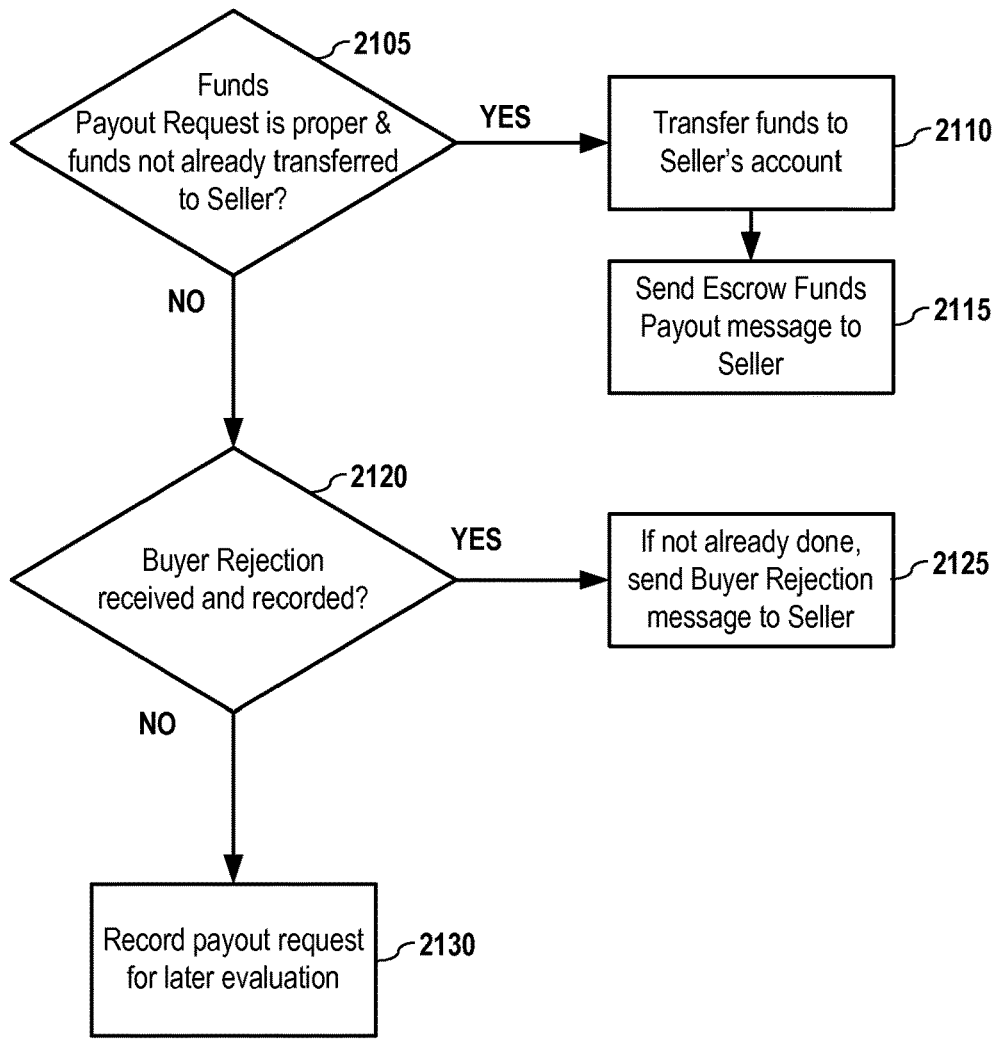
FIG. 21 a method for an Escrow which has received a Funds Payout Request message via a secure distributed transactional ledger within a set period according to embodiments of the present invention.

FIG. 21 a method for the Escrow which has received a Funds Payout Request message via a secure distributed transactional ledger according to embodiments of the present invention. In embodiments, after the Escrow has received a Funds Payout Request from a Seller, the Escrow determines (2105) whether the Request is proper. For example, while the Request may be made prior to the Escrow Payout Request timeout period, it is not proper to be acted upon by the Escrow until after that timeout period has expired and the Buyer has not sent a Buyer Rejection message.

In embodiments, once the Funds Payout Request is proper (i.e., the Escrow Payout Request timeout period has expired and the Buyer has not sent a Buyer Rejection message), the Escrow may also ascertain (2105) whether the escrowed funds have not already been transferred to the Seller. This check may be made in situations, for example, when the Seller's Request was submitted prior to the Buyer submitting a Release Funds message, which would result in the escrowed funds being transferred. In embodiments, if the escrowed funds have not been transferred to the Seller and transfer is proper, the funds are transferred (2110) and an Escrow Funds Payout message is sent (2115) to Seller.

In embodiments, if the Funds Payout Request is not proper (e.g., because the Escrow Payout Request timeout period has not expired), the Escrow may determine (2120) whether a Buyer Rejection was received and whether that message has been communicated to the Seller, as discussed with respect to FIG. 20. If a Buyer Rejection message has been received and the Seller has not yet been notified, the Escrow may then notify (2125) the Seller of the rejection by the Buyer and that the funds have been transferred to a third party.

In embodiments, if the Funds Payout Request is not proper and there has not yet been a Buyer Rejection message, the Escrow may record (2130) that the Fund Payout Request was made and will re-evaluate it as discussed below with respect to FIG. 22.

f) Escrow—"No Message Received" Procedure

Figure 22:
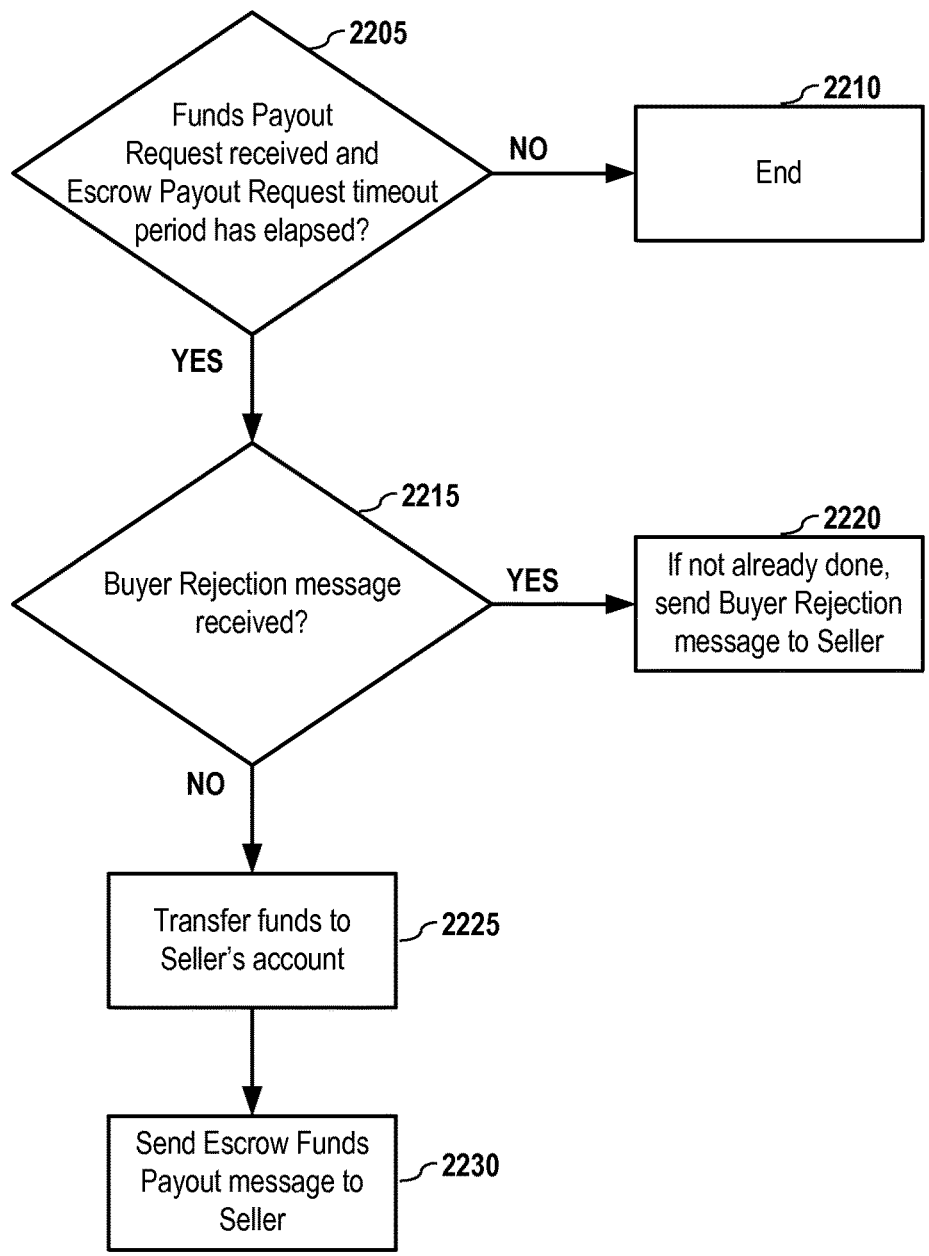
FIG. 22 a method for an Escrow when it has not received any messages via a secure distributed transactional ledger within a set period according to embodiments of the present invention.

FIG. 22 a method for the Escrow when it has not received any messages via a secure distributed transactional ledger within a set period according to embodiments of the present invention. In embodiments, when no message has been received within a specified time period, the Escrow determines (2205) whether any Funds Payout Requests have been received that have not yet been finalized. Specifically, in embodiments, the Escrow determines, for each pending Funds Payout Request, whether its associated Escrow Payout Request timeout period has elapsed.

If the timeout period has not yet elapsed, the process ends (2210), and the Escrow returns to listening for messages.

If the timeout period has elapsed, the Escrow determines (2215) whether there is a Buyer Rejection message for this agreement. In embodiments, responsive to there being no Buyer Rejection message existing for that agreement, the Escrow transfers (2225) the escrowed funds to the Seller's account. In embodiments, the Escrow may also send (2230) the Seller an Escrow Funds Payout message to notify the Seller that it has attending to the transfer.

In embodiments, responsive to there being (2215) a Buyer Rejection message, the Escrow notifies (2220) the Seller of the Buyer Rejection message, if it has not already been done.

E. System Embodiments

As noted previously, areas of applicability of these methodologies are for devices that facilitate marketplaces and marketplace transactions using a decentralized secured transaction ledger. Examples of devices are presented below.

1. Information Handling System

In embodiments, aspects of the present patent document may be directed to information handling systems/computing devices. For purposes of this disclosure, an information handling system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data for business, scientific, control, or other purposes. For example, an information handling system may be a personal computer (e.g., laptop), tablet computer, phablet, personal digital assistant (PDA), smart phone, smart watch, smart package, server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 23:
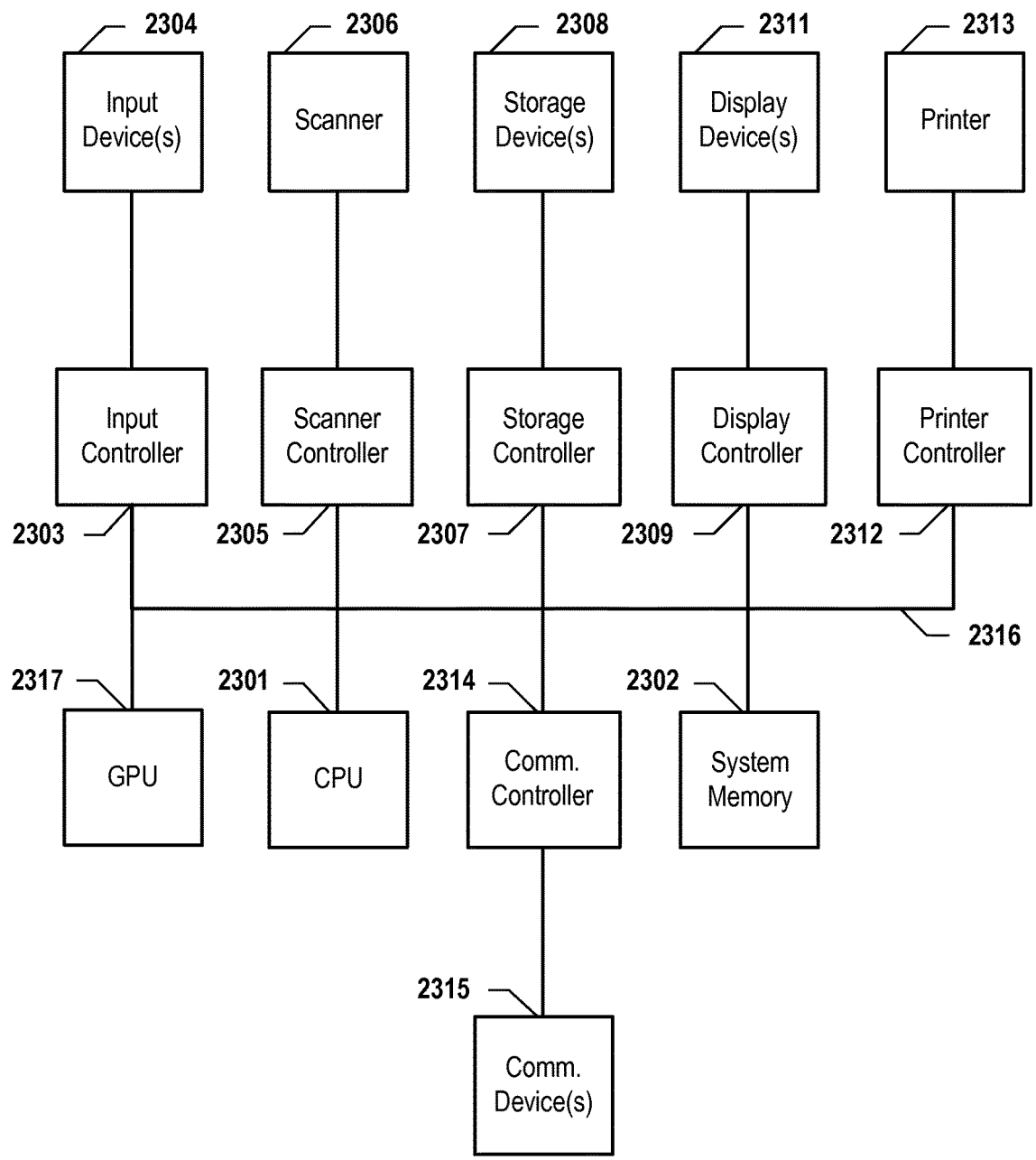
FIG. 23 depicts a simplified block diagram of an alternative embodiment of configuration/instructions-execution modules according to embodiments of the present invention.

FIG. 23 depicts a simplified block diagram of an information handling system according to embodiments of the present invention. It will be understood that the functionalities shown for system 2300 may operate to support various embodiments of an information handling system—although it shall be understood that an information handling system may be differently configured and include different components.

As illustrated in FIG. 23, system 2300 includes one or more central processing units (CPU) 2301 that provides computing resources and controls the computer. CPU 2301 may be implemented with a microprocessor or the like, and may also include one or more graphics processing units (GPU) 2317 and/or a floating point coprocessor for mathematical computations. System 2300 may also include a system memory 2302, which may be in the form of random-access memory (RAM), read-only memory (ROM), or both.

A number of controllers and peripheral devices may also be provided, as shown in FIG. 23. An input controller 2303 represents an interface to various input device(s) 2304, such as a keyboard, mouse, or stylus. There may also be a scanner controller 2305, which communicates with a scanner 2306. System 2300 may also include a storage controller 2307 for interfacing with one or more storage devices 2308 each of which includes a storage medium such as magnetic tape or disk, or an optical medium that might be used to record programs of instructions for operating systems, utilities, and applications, which may include embodiments of programs that implement various aspects of the present invention. Storage device(s) 2308 may also be used to store processed data or data to be processed in accordance with the invention. System 2300 may also include a display controller 2309 for providing an interface to a display device 2311, which may be a cathode ray tube (CRT), a thin film transistor (TFT) display, or other type of display. The computing system 2300 may also include a printer controller 2312 for communicating with a printer 2313. A communications controller 2314 may interface with one or more communication devices 2315, which enables system 2300 to connect to remote devices through any of a variety of networks including the Internet, a cloud resource (e.g., an Ethernet cloud, an Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals.

In the illustrated system, all major system components may connect to a bus 2316, which may represent more than one physical bus. However, various system components may or may not be in physical proximity to one another. For example, input data and/or output data may be remotely transmitted from one physical location to another. In addition, programs that implement various aspects of this invention may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

In embodiments, the computing device 2300 may comprise one or more modules for performing one or more of the methods discussed herein. For example, in embodiments, a system 800 may comprise a block chain communication proxy module, a message receiving module that receives message that may contain data, credentials, and/or instructions extracted from the block chain, and an authentication component.

In embodiments, the block chain communication proxy module interfaces with the distributed network. In embodiments, one of its functions is to abstract the details of the communications channel by leveraging the block chain to retrieve and store data. In embodiments, the block chain communication proxy module, or the block chain communication proxy module in conjunction with the message receiving module and the authentication module, receives messages from the block chain and uses the digital signature associated with the message to authenticate that the source of the message is from an entity from which the device should take messages. In embodiments, the system 800 may include an encryption module to perform one or more encryption/decryption-related functions.

In embodiments, the system 800 may also include a system interface module to interface with the system components for various purposes. For example, the system interface may interface with the one or more components of the device to read and/or write data, to send and receive data (including messages), to disable or enable features, and to display alerts. In embodiments, the system interface may use existing interfaces of the system. In embodiments, these interfaces provide abstract representations of the physical devices. In embodiments, these abstractions separate the functions from the details of a particular hardware instance or architecture. This ensures that embodiments of the present invention are applicable to a broad class of information handling devices that can provide such interface abstractions.

In embodiments, the device 800 may also include a mining module to perform mining operations related to the distribute network and the maintenance of the block chain.

Because this process can be resource intensive, the computing device may not perform full mining functions. In embodiments, the computing device may only perform limited functionality. In embodiments, the computing device may only perform resource intensive operations when the computing device is plugged into a stable, continuous power source rather than a battery. In embodiments, the computing device may be such that it is loaded compared to its computational capacity. An example might be a device embedded in relatively static environment such as a building or a vehicle, where it is well powered and has good network connectivity, and that monitors environmental parameters (e.g., the temperature). Such a device would be a good candidate to play the role of a mining node in the distributed network.

Embodiments of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present invention may further relate to computer products with a non-transitory, tangible computer-readable medium that have computer code thereon for performing various computer-implemented operations. The media and computer code may be those specially designed and constructed for the purposes of the present invention, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present invention. One skilled in the art will also recognize that a number of the elements described above may be physically and/or functionally separated into sub-modules or combined together.

It will be appreciated to those skilled in the art that the preceding examples and embodiments are exemplary and not limiting to the scope of the present invention. It is intended that all permutations, enhancements, equivalents, combinations, and improvements thereto that are apparent to those skilled in the art upon a reading of the specification and a study of the drawings are included within the true spirit and scope of the present invention.

What is claimed is:

1. A computer-implemented method for a computing device participating as a first entity, the method comprising:
    connecting to one or more nodes of a distributed peer-to-peer network that maintains a block chain, the block chain comprising a cryptographically linked sets of data blocks and comprising a plurality of programmatic intermediary implementations, each programmatic intermediary implementation comprising a published set of operations in which each operation of at least some of the published set of operations comprises a set of one or more conditions and a corresponding action that is automatically performed by the programmatic intermediary implementation when a message that includes an identifier of the programmatic intermediary implementation is included within the block chain, is received by the programmatic intermediary implementation, and the programmatic intermediary implementation determines that the set of one or more conditions necessary for triggering performance of the corresponding action have been satisfied;
    obtaining at least part of the block chain;
    examining one or more of the data blocks of the block chain for a request message comprising a request that the first entity is capable of fulfilling and an identifier of a programmatic intermediary implementation;
    responsive to identifying a request message comprising the request that the first entity is capable of fulfilling and the identifier of a programmatic intermediary implementation, examining a set of past actions performed by the programmatic intermediary implementation identified in the request message, which set of past actions are recorded in the block chain, to determine whether the programmatic intermediary implementation's past actions have a consistency with its published set of operations that is acceptable to the first entity; and
    responsive to the programmatic intermediary implementation's past actions having a consistency with its published set of operations that is acceptable to the first entity:
        submitting a response message for inclusion in the block chain to signal to a sender of the request message that the first entity has accepted fulfilling the request; and
        responsive to receiving a proceed message from the programmatic intermediary implementation, executing one or more instructions related to the relevant request message to fulfill the request.

2. The computer-implemented method of claim 1 further comprising:
    responsive to identifying a message applicable to the first entity within a specified time period, executing one or more instructions related to the message applicable to the first entity; and responsive to not identifying a message applicable to the first entity within a specified time period:
  determining whether any deliverable is ready for its intended recipient; and
  responsive to determining that a deliverable is ready for its intended recipient:
    sending the deliverable to the intended recipient; and
    sending a "funds payout request" message to the programmatic intermediary implementation via the block chain, the "funds payout request" message requesting payment of funds for sending the deliverable to the intended recipient.

3. The computer-implemented method of claim 2 wherein the step of responsive to identifying a message applicable to the first entity within a specified time period, executing one or more instructions related to the message applicable to the first entity comprises:
  responsive to identifying the message as a "proposal broadcast" message comprising one or more terms from the sender:
    determining whether one or more terms in the "proposal broadcast" message are acceptable to the first entity; and
    responsive to the one or more terms in the "proposal broadcast" message being acceptable, submitting, to one or more nodes of the distributed peer-to-peer network that maintains the block chain, a "proposal accepted" message to be included in the block chain, the "proposal accepted" message intended for the sender; and
  responsive to the one or more terms in the "proposal broadcast" message not being acceptable, submitting, to one or more nodes of the distributed peer-to-peer network that maintains the block chain, a "proposal counteroffer" message intended for the sender, which is to be included in the block chain, the "proposal counteroffer" message comprising a proposed change to the one or more terms that were not acceptable to the first entity.

4. The computer-implemented method of claim 3 further comprising:
  determining whether the sender is an acceptable party to the first entity.

5. The computer-implemented method of claim 4 wherein the step of determining whether the sender is an acceptable party to the first entity comprises:
  examining data related to one or more prior agreements involving the sender, the one or more prior agreements being recorded in the block chain.

6. The computer-implemented method of claim 2 wherein the step of responsive to identifying a message applicable to the first entity within a specified time period, executing one or more instructions related to the message applicable to the first entity comprises:
  responsive to identifying the message applicable to the first entity as a "proposal counteroffer" message comprising one or more terms from the sender:
    determining whether one or more terms in the "proposal counteroffer" message are acceptable to the first entity; and
    responsive to the one or more terms in the "proposal counteroffer" message being acceptable, submitting, to one or more nodes of the distributed peer-to-peer network that maintains the block chain, a "proposal accepted" message to be included in the block chain, the "proposal accepted" message intended for the sender; and
    responsive to the one or more terms in the "proposal broadcast" message not being acceptable:
      deciding whether to continue negotiations with the sender;
      responsive to deciding not to continue negotiations with the sender, taking no action; and
      responsive to deciding to continue negotiations with the sender, submitting, to one or more nodes of the distributed peer-to-peer network that maintains the block chain, a "proposal counteroffer" message intended for the sender, which is to be included in the block chain, the "proposal counteroffer" message comprising a proposed change to the one or more terms that were not acceptable to the first entity.

7. The computer-implemented method of claim 2 wherein the step of responsive to identifying a message applicable to the first entity within a specified time period, executing one or more instructions related to the message applicable to the first entity comprises:
  responsive to identifying the message applicable to the first entity as a "proposal accepted" message from the sender; and
  responsive to the "proposal accepted" message from the sender resulting in an agreement with the sender and the first entity being formed, waiting for a "funds in escrow" message from the programmatic intermediary implementation delivered via the block chain, the "funds in escrow" message indicated that an escrow entity has in escrow an appropriate amount due under the agreement.

8. The computer-implemented method of claim 7 further comprising:
  responsive to receiving a "funds in escrow" message:
    sending a deliverable as defined in the agreement to an intended recipient; and
    sending a "funds payout request" message to the programmatic intermediary implementation via the block chain, the "funds payout request" message requesting payment of funds for sending the deliverable to the intended recipient according to the agreement.

9. The computer-implemented method of claim 1 wherein the programmatic intermediary implementation performs its operations programmatically as part of maintenance of the block chain by the distributed peer-to-peer network.

10. The computer-implemented method of claim 1 wherein the request is for a deliverable comprising:
  performing a computation task or set of computation tasks;
  transmitting a digital file or set of digital files; or
  both.

11. A non-transitory computer-readable medium or non-transitory computer-readable media comprising one or more sequences of instructions which, when executed by at least one processor, causes steps for a computing device participating as a first entity comprising:
  connecting to one or more nodes of a distributed peer-to-peer network that maintains a block chain, the block chain comprising a cryptographically linked sets of data blocks and comprising a plurality of programmatic intermediary implementations, each programmatic intermediary implementation comprising a published set of operations in which each operation of at least some of the published set of operations comprises a set of one or more conditions and a corresponding action that is automatically performed by the programmatic intermediary implementation when a message that includes an identifier of the programmatic intermediary implementation is included within the block chain, is received by the programmatic intermediary implementation, and the programmatic intermediary implementation determines that the set of one or more conditions necessary for triggering performance of the corresponding action have been satisfied;

obtaining at least part of the block chain;

examining one or more of the data blocks of the block chain for a request message comprising a request that the first entity is capable of fulfilling and an identifier of a programmatic intermediary implementation;

responsive to identifying a request message comprising the request that the first entity is capable of fulfilling and the identifier of a programmatic intermediary implementation, examining a set of past actions performed by the programmatic intermediary implementation identified in the request message, which set of past actions are recorded in the block chain, to determine whether the programmatic intermediary implementation's past actions have a consistency with its published set of operations that is acceptable to the first entity; and responsive to the programmatic intermediary implementation's past actions having a consistency with its published set of operations that is acceptable to the first entity:

submitting a response message for inclusion in the block chain to signal to a sender of the request message that the first entity has accepted fulfilling the request; and responsive to receiving a proceed message from the programmatic intermediary implementation, executing one or more instructions related to the request message to fulfill the request.

12. The non-transitory computer-readable medium or media of claim 11 further comprising one or more sequences of instructions which, when executed by at least one processor, causes steps to be performed comprising:

responsive to identifying a message applicable to the first entity within a specified time period, executing one or more instructions related to the message applicable to the first entity; and responsive to not identifying a message applicable to the first entity within a specified time period:

determining whether any deliverable is ready for its intended recipient; and responsive to determining that a deliverable is ready for its intended recipient:

sending the deliverable to the intended recipient; and sending a "funds payout request" message to the programmatic intermediary implementation via the block chain, the "funds payout request" message requesting payment of funds for sending the deliverable to the intended recipient.

13. The non-transitory computer-readable medium or media of claim 12 wherein the step of responsive to identifying a message applicable to the first entity within a specified time period, executing one or more instructions related to the message applicable to the first entity comprises:

responsive to identifying the message as a "proposal broadcast" message comprising one or more terms from the sender:

determining whether one or more terms in the "proposal broadcast" message are acceptable to the first entity; and responsive to the one or more terms in the "proposal broadcast" message being acceptable, submitting, to one or more nodes of the distributed peer-to-peer network that maintains the block chain, a "proposal accepted" message to be included in the block chain, the "proposal accepted" message intended for the sender; and responsive to the one or more terms in the "proposal broadcast" message not being acceptable, submitting, to one or more nodes of the distributed peer-to-peer network that maintains the block chain, a "proposal counteroffer" message intended for the sender, which is to be included in the block chain, the "proposal counteroffer" message comprising a proposed change to the one or more terms that were not acceptable to the first entity.

14. The non-transitory computer-readable medium or media of claim 13 further comprising one or more sequences of instructions which, when executed by at least one processor, causes steps to be performed comprising:

determining whether the sender is an acceptable party to the first entity by examining data related to one or more prior agreements involving the sender, the one or more prior agreements being recorded in the block chain.

15. The non-transitory computer-readable medium or media of claim 12 wherein the step of responsive to identifying a message applicable to the first entity within a specified time period, executing one or more instructions related to the message applicable to the first entity comprises:

responsive to identifying the message applicable to the first entity as a "proposal counteroffer" message comprising one or more terms from the sender:

determining whether one or more terms in the "proposal counteroffer" message are acceptable to the first entity; and responsive to the one or more terms in the "proposal counteroffer" message being acceptable, submitting, to one or more nodes of the distributed peer-to-peer network that maintains the block chain, a "proposal accepted" message to be included in the block chain, the "proposal accepted" message intended for the sender; and responsive to the one or more terms in the "proposal broadcast" message not being acceptable:

deciding whether to continue negotiations with the sender;

responsive to deciding not to continue negotiations with the sender, taking no action; and responsive to deciding to continue negotiations with the sender, submitting, to one or more nodes of the distributed peer-to-peer network that maintains the block chain, a "proposal counteroffer" message intended for the sender, which is to be included in the block chain, the "proposal counteroffer" message comprising a proposed change to the one or more terms that were not acceptable to the first entity.

16. The non-transitory computer-readable medium or media of claim 12 wherein the step of responsive to identifying a message applicable to the first entity within a specified time period, executing one or more instructions related to the message applicable to the first entity comprises:

responsive to identifying the message applicable to the first entity as a "proposal accepted" message from the sender; and responsive to the "proposal accepted" message from the sender resulting in an agreement with the sender and the first entity being formed, waiting for a "funds in escrow" message from the programmatic intermediary implementation delivered via the block chain, the "funds in escrow" message indicated that an escrow entity has in escrow an appropriate amount due under the agreement.

17. An information handling system comprising:
one or more processors; and
a non-transitory computer-readable medium or media comprising one or more sets of instructions which, when executed by the at least one of the one or more processors, causes steps to be performed comprising:
connecting to one or more nodes of a distributed peer-to-peer network that maintains a block chain, the block chain comprising a cryptographically linked sets of data blocks and comprising a plurality of programmatic intermediary implementations, each programmatic intermediary implementation comprising a published set of operations in which each operation of at least some of the published set of operations comprises a set of one or more conditions and a corresponding action that is automatically performed by the programmatic intermediary implementation when a message that includes an identifier of the programmatic intermediary implementation is included within the block chain, is received by the programmatic intermediary implementation, and the programmatic intermediary implementation determines that the set of one or more conditions necessary for triggering performance of the corresponding action have been satisfied;
obtaining at least part of the block chain;
examining one or more of the data blocks of the block chain for a request message comprising a request that a first entity is capable of fulfilling and an identifier of a programmatic intermediary implementation;
responsive to identifying a request message comprising the request that the first entity is capable of fulfilling and the identifier of a programmatic intermediary implementation, examining a set of past actions performed by the programmatic intermediary implementation identified in the request message, which set of past actions are recorded in the block chain, to determine whether the programmatic intermediary implementation's past actions have a consistency with its published set of operations that is acceptable to the first entity; and
responsive to the programmatic intermediary implementation's past actions having a consistency with its published set of operations that is acceptable to the first entity:
submitting a response message for inclusion in the block chain to signal to a sender of the request message that the first entity has accepted fulfilling the request; and
responsive to receiving a proceed message from the programmatic intermediary implementation, executing one or more instructions related to the request message to fulfill the request.

18. The information handling system of claim 17 wherein the non-transitory computer- readable medium or media further comprising one or more sequences of instructions which, when executed by at least one of the one or more processors, causes steps to be performed comprising:

responsive to identifying a message applicable to the first entity within a specified time period, executing one or more instructions related to the message applicable to the first entity; and
responsive to not identifying a message applicable to the first entity within a specified time period:
determining whether any deliverable is ready for its intended recipient; and
responsive to determining that a deliverable is ready for its intended recipient:
sending the deliverable to the intended recipient; and
sending a "funds payout request" message to the programmatic intermediary implementation via the block chain, the "funds payout request" message requesting payment of funds for sending the deliverable to the intended recipient.

19. The information handling system of claim 18 wherein the step of responsive to identifying a message applicable to the first entity within a specified time period, executing one or more instructions related to the message applicable to the first entity comprises:
responsive to identifying the message as a "proposal broadcast" message comprising one or more terms from the sender:
determining whether one or more terms in the "proposal broadcast" message are acceptable to the first entity; and
responsive to the one or more terms in the "proposal broadcast" message being acceptable, submitting, to one or more nodes of the distributed peer-to-peer network that maintains the block chain, a "proposal accepted" message to be included in the block chain, the "proposal accepted" message intended for the sender; and
responsive to the one or more terms in the "proposal broadcast" message not being acceptable, submitting, to one or more nodes of the distributed peer-to-peer network that maintains the block chain, a "proposal counteroffer" message intended for the sender, which is to be included in the block chain, the "proposal counteroffer" message comprising a proposed change to the one or more terms that were not acceptable to the first entity.

20. The information handling system of claim 18 wherein the step of responsive to identifying a message applicable to the first entity within a specified time period, executing one or more instructions related to the message applicable to the first entity comprises:
responsive to identifying the message applicable to the first entity as a "proposal counteroffer" message comprising one or more terms from the sender:
determining whether one or more terms in the "proposal counteroffer" message are acceptable to the first entity; and
responsive to the one or more terms in the "proposal counteroffer" message being acceptable, submitting, to one or more nodes of the distributed peer-to-peer network that maintains the block chain, a "proposal accepted" message to be included in the block chain, the "proposal accepted" message intended for the sender; and
responsive to the one or more terms in the "proposal broadcast" message not being acceptable:
deciding whether to continue negotiations with the sender; responsive to deciding not to continue negotiations with the sender, taking no action; and responsive to deciding to continue negotiations with the sender, submitting, to one or more nodes of the distributed peer-to-peer network that maintains the block chain, a "proposal counteroffer" message intended for the sender, which is to be included in the block chain, the "proposal counteroffer" message comprising a proposed change to the one or more terms that were not acceptable to the first entity.

* * * * *